(12) United States Patent
Tanaka et al.

(10) Patent No.: US 7,163,723 B2
(45) Date of Patent: Jan. 16, 2007

(54) LIQUID CRYSTALLINE COMPOUND AND RETERDATION DIFFERENCE FILM USING THE SAME

(75) Inventors: Kouichi Tanaka, Tokyo (JP); Kenichiro Yoshioka, Tokyo (JP); Junji Toda, Saitama (JP); Hideyoshi Fujisawa, Saitama (JP)

(73) Assignees: Nippon Kayaku Kabushiki Kaisha, Tokyo (JP); Polatechno Co., Ltd., Niigata (JP)

( * ) Notice: Subject to any disclaimer, the term of this patent is extended or adjusted under 35 U.S.C. 154(b) by 89 days.

(21) Appl. No.: 10/476,748

(22) PCT Filed: May 9, 2002

(86) PCT No.: PCT/JP02/04523

§ 371 (c)(1), (2), (4) Date: Nov. 3, 2003

(87) PCT Pub. No.: WO02/093213

PCT Pub. Date: Nov. 21, 2002

(65) Prior Publication Data

US 2004/0141121 A1    Jul. 22, 2004

(30) Foreign Application Priority Data

May 10, 2001    (JP) .............................. 2001-140622

(51) Int. Cl.
*G02B 5/30* (2006.01)
*C09K 19/52* (2006.01)
*C09K 19/38* (2006.01)

(52) U.S. Cl. ........................ 428/1.1; 428/1.3; 428/1.31; 252/299.01; 349/117

(58) Field of Classification Search ................. 428/1.1, 428/1.2, 1.3, 1.26, 1.31; 252/299.01, 299.5; 349/117
See application file for complete search history.

(56) References Cited

U.S. PATENT DOCUMENTS 5,629,055 A * 5/1997 Revol et al. ............... 428/1.31

| | | | |
|---|---|---|---|
| 5,814,141 A | * | 9/1998 | Kirschbaum et al. ... 106/162.82 |
| 6,197,224 B1 | | 3/2001 | Shimamoto .................. 252/585 |
| 6,572,939 B1 | * | 6/2003 | Kwon et al. .................. 428/1.2 |

FOREIGN PATENT DOCUMENTS

| | | | |
|---|---|---|---|
| JP | 10-073723 | | 3/1998 |
| JP | 11-006990 | | 1/1999 |
| JP | 2000-137116 | * | 5/2000 |
| JP | 2000-352620 | | 12/2000 |
| JP | 2001-042123 | | 2/2001 |
| JP | 2001-235622 | | 8/2001 |
| JP | 2002-048919 | | 2/2002 |
| JP | 2002-267838 | | 9/2002 |
| JP | 2002-296415 | | 10/2002 |
| WO | 99/01788 | | 1/1999 |

OTHER PUBLICATIONS

English translation by computer for JP 2000-137116, http://www4.ipdl.ncipi.go.jp/Tokujitu/PAJdetail.ipdl?N0000=60&N0120=01&N2001=2&N3001=2000-137116.*

* cited by examiner

*Primary Examiner*—Shean C. Wu
(74) *Attorney, Agent, or Firm*—Nields & Lemack

(57) ABSTRACT

A phase difference film which comprises a liquid crystal film having a liquid crystal comprised of a cellulose derivative as a liquid crystal compound (cellulose derivative liquid crystal) being oriented in a specific direction, preferably said phase difference film wherein said orientation in a specific direction is fixed. In said liquid crystal film, through changing appropriately the molecular weight of the cellulose derivative, the composition of the liquid crystal, the degree of the orientation, and the like, films having various wave length dispersion characteristics can be prepared with ease, and further a phase difference film satisfying the following relationship: $\Delta n450 = \Delta n550 = \Delta n650$ (1) wherein $\Delta n550$ represents a double refractive index at a wave length of 550 nm, $\Delta n450$ represents a double refractive index at a wave length of 450 nm, and $\Delta n650$ represents a double refractive index at a wave length of 650 nm, can be prepared without laminating a plurality of phase difference films. Said phase difference film, used in combination with a polarizing film, exhibits excellent reflection preventing effect, contrast improving effect, double refraction compensating effect, and the like.

21 Claims, 3 Drawing Sheets

LIQUID CRYSTALLINE COMPOUND AND RETERDATION DIFFERENCE FILM USING THE SAME

TECHNICAL FIELD

The present invention relates to a retardation film useful for image display devices such as liquid crystal display devices.

BACKGROUND ART

Hitherto, phase retardation film are obtained by uniaxially stretching plastic films such as polycarbonates, polyarylates, and polyethersulfones and having functions to convert a polarization axis of a linearly polarized light (optical rotatory) and to convert a linearly polarized light into a circularly polarized light or an elliptically polarized light. Such retardation film usually have so-called wavelength dispersion characteristics such that the retardation varies depending upon the wavelength, and the wavelength dispersion characteristics vary depending upon the material to be used. Generally used retardation films have a retardation value which is smaller than the value at 550 nm in a longer wavelength side than 550 nm, and have a retardation value, which is larger than the phase retardation value at 550 nm in a shorter wavelength side. Also, such a tendency is more remarkable in the shorter wavelength side This causes a problem such that for example, in the case where a reflection preventing filter is prepared using a retardation film whose retardation is ¼ of the wavelength (so-called a ¼-wavelength plate), a sufficient reflection preventing effect is obtained only in wavelength regions where the retardation is approximately ¼, and the circularly polarized light becomes an elliptically polarized light in other wavelengths, resulting in failing in obtaining a sufficient reflection preventing effect. Also, in the case where an optical rotator to be used for liquid crystal projectors, etc. is prepared using a retardation film whose retardation is ½ of the wavelength (so-called a ½-wavelength plate), the linearly polarized light can be rotated as a linearly polarized light only in regions where the retardation is approximately ½, and the linearly polarized light becomes an elliptically polarized light in other wavelengths, resulting in failing in obtaining a sufficiently optical rotatory effect. Also, even in elliptically polarizing films to compensate double refraction properties that liquid crystal cells to be used in liquid crystal display devices have, unless retardation films having wavelength dispersion characteristics corresponding to the wavelength dispersion characteristics that the liquid crystal cells have are used, the wavelength region where the double refraction properties can be compensated is limited, resulting in lowering contrast and visibility of display images.

Against these problems, for example, JP-A-H05-100114 proposes a method of laminating plural stretched films while intersecting optical axes thereof. However, this method involved a problem to cause an increase of thickness due to use of the plural stretched films and complication in the production step and a reduction of yield so as to laminate the plural films while intersecting their optical axes (the retardation films must be cut in order to intersect the optical axes). On the other hand, JP-A-2000-137116 discloses a method in which an organic acid ester of cellulose, particularly cellulose acetate having a specific degree of substitution, is dissolved together with dibutyl phthalate as a plasticizer in a methylene chloride/methanol mixed solvent, from which is then formed a film, and the film is stretched to form a retardation plate. Since it is possible to impart retardation having the same degree in respective wavelengths over a wide range in a visible region by one sheet of the film, the formed retardation plate is excellent as a retardation plate that can convert a circularly polarized light into a linearly polarized light or conversely convert a linearly polarized light into a circularly polarized light in wavelength regions over a wide range by one sheet of film without need of lamination. However, materials capable of improving wavelength dispersion characteristics by one sheet as described in the foregoing patent publication are not known by any other publications than the foregoing patent publication, and the materials are limited. In addition, in the case of the foregoing patent publication, for imparting flexibility to the film, a plasticizer is necessary, so that problems on the points of heat resistance and water resistance remained. Moreover, in retardation films using an elliptically polarizing film for compensating double refraction properties of a liquid crystal cell in a liquid crystal display device, retardation films having wavelength dispersion characteristics corresponding to the wavelength dispersion characteristics that the liquid crystal compound within the liquid crystal cell has must be used. It is not easy to prepare retardation films that can correspond freely to liquid crystal cells having varied wavelength dispersion characteristics depending upon the drive mode. For adjusting the wavelength dispersion, plural retardation films must be laminated, or materials exhibiting such wavelength dispersion characteristics must be prepared. In such materials, for forming a film, a polymer is used, and it is not easy to synthesize the desired polymer and mold it into a film.

On the other hand, it is known that various cellulose derivatives exhibit lyotropic liquid crystalline properties and that derivatives such as trifluoroacetate ester exhibit thermotropic liquid crystalline properties (*Journal of Applied Polymer Science: Applied Polymer Symposium*, 37, 179–192). However, it is not known that these liquid crystals are oriented in a specific direction and can be utilized as a retardation film.

DISCLOSURE OF THE INVENTION

In order to solve the foregoing problems, the present inventors made extensive and intensive investigations. As a result, it has been found that not only a film made of a liquid crystal (liquid crystal polymer) comprising a cellulose derivative as a liquid crystal compound can be easily oriented in a specific direction by shearing, etc., but also retardation films having various wavelength dispersion characteristics can be easily prepared by changing molecular weight of a cellulose derivative to be used or changing a formulation of a film forming composition; that by using a cellulose derivative having a reactive group as a substituent or using a cellulose derivative liquid crystal using a liquid reactive compound as a solvent, orientation of a liquid crystal in a specific direction can be easily fixed, thereby enabling to form a retardation film having excellent water resistance and heat resistance, etc.; and that when the film oriented in a specific direction satisfies the following relationship (1):

$$\Delta n450 \leq \Delta n550 \leq \Delta n650 \tag{1}$$

(wherein $\Delta n450$ represents a birefringent value at a wavelength of 450 nm; $\Delta n550$ represents a birefringent value at a wavelength of 550 nm; and $\Delta n650$ represents a birefringent value at a wavelength of 650 nm), a retardation films having various wavelength dispersion characteristics can be easily prepared, leading to accomplishment of the invention. Specifically, the invention relates to the followings:

1. A retardation film comprising a film in which a liquid crystal comprising a cellulose derivative as a liquid crystal compound (hereinafter referred to as a cellulose derivative liquid crystal) is oriented in a specific direction.

2. A retardation film comprising a film in which orientation of a cellulose derivative liquid crystal is fixed in a specific direction.

3. A retardation film comprising a film in which orientation of a cellulose derivative liquid crystal is fixed in a specific direction by crosslinking or polymerization of a reactive substituent on the cellulose derivative or by crosslinking or polymerization of a reactive compound of a liquid crystal constituting component.

4. A retardation film comprising a film in which a cellulose derivative liquid crystal is oriented in a specific direction, wherein the film satisfy the following relationship (1):

$$\Delta n450 \leq \Delta n550 \leq \Delta n650 \qquad (1)$$

wherein $\Delta n450$ represents a birefringent value at a wavelength of 450 nm; $\Delta n550$ represents a birefringent value at a wavelength of 550 nm; and $\Delta n$ 650 represents a birefringent value at a wavelength of 650 nm.

5. The retardation film according to any one of the foregoing items 1 to 4, wherein the cellulose derivative in the cellulose derivative liquid crystal is a thermotropic liquid crystal compound or a compound having a lyotropic liquid crystal capability.

6. The retardation film according to the foregoing item 5, wherein the cellulose derivative in the cellulose derivative liquid crystal is an ester in which a substituent on a hydroxyl group of a hydroxy(C1–C4)alkyl cellulose is an acyl group having from 1 to 10 carbon atoms or a (C1–C10)hydrocarbon residue-substituted carbamoyl group, or an ether in which a substituent on a hydroxyl group of the hydroxy (C1–C4)alkyl cellulose is a hydrocarbon residue having from 1 to 10 carbon atoms.

7. The retardation film according to the foregoing item 6, wherein the ester is an ester having either one of an acyl group containing at least an aliphatic unsaturated double bond and having from 4 to 10 carbon atoms or a tertiary acyl group having from 4 to 10 carbon atoms as the acyl group in the ester.

8. The retardation film according to the foregoing item 7, wherein the acyl group containing an aliphatic unsaturated double bond and having from 4 to 10 carbon atoms is an acryloyl group, and the tertiary acyl group having from 4 to 10 carbon atoms is a pivaloyl group.

9. The retardation film according to any one of the foregoing items 1 to 4, wherein the cellulose derivative in the cellulose derivative liquid crystal is a cellulose derivative having a structure represented by the following formula:

[Formula 1]

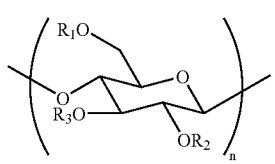

(wherein $R_1$, $R_2$, and $R_3$ each independently represents $CH_3CH(OX)CH_2$—, $XOCH_2CH_2$—, or Xa; X and Xa are an substituent; $R_1$, $R_2$, and $R_3$ may be the same or different; and n is an integer of 10 or more), and the derivative itself is a thermotropic liquid crystal compound, or the derivative is a compound having a lyotropic liquid crystal capability.

10. The retardation film according to any one of the foregoing items 1 to 4, wherein the cellulose derivative is a cellulose derivative represented by the foregoing general formula [Formula 1] wherein at least one of plurality of X or Xa present in one molecule represents a group different from H; and plurality of $R_1$, $R_2$, and $R_3$ present in one molecule represents at least two kinds of substituents different from each other.

11. The retardation film according to the foregoing item 9, wherein the thermotropic liquid crystal compound is a hydroxy(C1–C4)alkyl cellulose ester having at least either one of an (C4–C10) acyl group containing an aliphatic unsaturated double bond or a tertiary acyl group having from 4 to 10 carbon atoms as the acyl group in the ester, and being substituted by the acyl group in a degree of 10% or more of total hydroxyl groups in the molecule.

12. The retardation film according to the foregoing item 3, wherein the fixation of orientation into a specific direction in a cellulose derivative liquid crystal is carried out in the presence of a photopolymerization initiator.

13. The retardation film according to the foregoing item 12, wherein the fixation of orientation is carried out by irradiation of ultraviolet rays.

14. The retardation film according to the foregoing item 3, wherein the reactive compound is a (meth)acrylate compound.

15. The retardation film according to any one of the foregoing items 1 to 4, wherein at least one of the specific directions is a direction where a refractive index within the resulting retardation film plane becomes the maximum.

16. The retardation film according to any one of the foregoing items 1 to 4, wherein a retardation value in a longer wavelength side than 550 nm is equal to or larger than that at 550 nm, and a retardation value in a shorter wavelength side than 550 nm is equal to or smaller than that at 550 nm.

17. The retardation film according to the foregoing item 16, wherein a birefringent value at 550 nm ($\Delta n550$) is 0.0020 or more.

18. The retardation film according to the foregoing item 17, wherein the retardation is a ¼ wavelength or a ½ wavelength.

19. A circularly or elliptically polarizing film or optical rotatory film comprising a laminated film of the retardation film according to the foregoing item 17 and a polarizing film.

20. An image display device having the retardation film according to the foregoing item 17.

21. A thermotropic liquid crystalline compound, which, when formed into a film, satisfies the following relationship (1):

$$\Delta n450 \leq \Delta n550 \leq \Delta n650 \qquad (1)$$

wherein $\Delta n450$ represents a birefringent value at a wavelength of 450 nm; $\Delta n550$ represents a birefringent value at a wavelength of 550 nm; and $\Delta n650$ represents a birefringent value at a wavelength of 650 nm.

22. The thermotropic liquid crystalline compound according to the foregoing item 21, wherein the thermotropic liquid crystalline compound is a cellulose derivative.

23. A hydroxy(C1–C4)alkyl cellulose ester as a cellulose derivative, characterized by having either one of an acyl group containing an aliphatic unsaturated double bond and having from 4 to 10 carbon atoms or a tertiary acyl group having from 4 to 10 carbon atoms as the acyl group in the ester, and when the ester has an acyl group containing an aliphatic unsaturated double bond and having from 4 to 10 carbon atoms, the ester further contains an alkylcarbonyl group having from 1 to 10 carbon atoms.

24. A liquid crystal film forming composition containing at least either one of following (1) or (2);
(1) a thermotropic liquid crystalline cellulose derivative containing a reactive substituent or
(2) both a cellulose derivative having a lyotropic liquid crystal capability and a reactive compound, and a photopolymerizable initiator, and, when the foregoing (2) is contained, containing both the cellulose derivative having a lyotropic liquid crystal capability and the reactive compound in a proportion such that a mixed solution of the both forms a lyotropic liquid crystal.

25. A film comprising a cellulose derivative liquid crystal oriented to a specific direction.

26. A film in which orientation of a cellulose derivative liquid crystal to a specific direction is fixed.

BEST MODE FOR CARRYING OUT THE INVENTION

Figure 1:
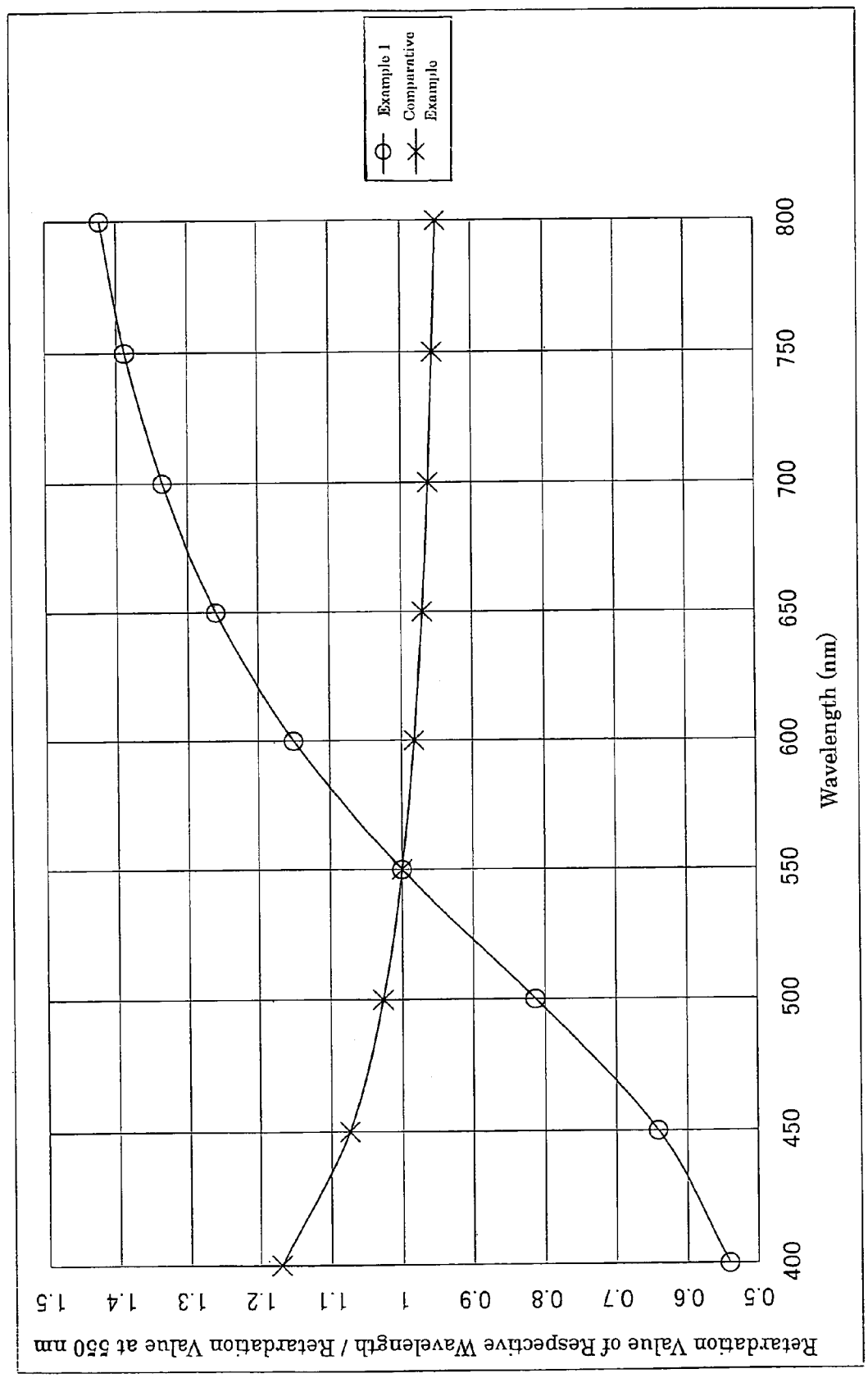
FIG. 1 is a graph showing wavelength dispersion characteristics as measured with respect to a film obtained in Example 1 and a film obtained in Comparative Example.

In the invention, the term "liquid crystals comprising a cellulose derivative as a liquid crystal compound" means that the cellulose derivative is in the liquid crystal state (liquid crystal polymer) and includes any of the case where the cellulose derivative per se may form a thermotropic liquid crystal and the case where the cellulose derivative may form a lyotropic liquid crystal.

As the cellulose derivative that is used as a liquid crystal compound in the invention, any of thermotropic liquid crystalline cellulose derivatives that exhibit liquid crystalline properties themselves and cellulose derivatives having a lyotropic liquid crystal capability, which exhibit liquid crystalline properties in solutions (hereinafter the both being sometimes referred to simply as "liquid crystalline cellulose derivative") can be used. As such cellulose derivatives, for example, cellulose derivatives having a structure such that various substituents are introduced into a hydroxyl group of a cellulose to exhibit liquid crystalline properties, as described in Richard D. Gilbert, *Cellulosic Polymers, Blends and Composites*, pp.25–94 (Hanser Publishers); hydroxyalkyl cellulose derivatives having a structure such that various substituents are introduced into a hydroxyl group of hydroxyethyl cellulose, hydroxypropyl cellulose, etc. to exhibit liquid crystalline properties; cellulose derivatives exhibiting a lyotropic liquid crystal as described in *Journal of Applied Polymer Science: Applied Polymer Symposium*, 37, 179–192; and cellulose derivatives exhibiting thermotropic liquid crystalline properties are known. Also, as described later, cellulose derivatives synthesized by the present inventors can suitably be used. As such derivatives can be enumerated cellulose derivatives in which a hydrogen atom of the hydroxyl group on a cellulose is substituted with other substituent such as an acyl group, an optionally substituted alkyl group, an optionally substituted aromatic group, an alkyl-substituted or acyl-substituted carbambyl group, and an imido group; and cellulose derivatives in which the hydroxyl group of a hydroxyalkyl cellulose is further substituted with the foregoing substituent. Above all, cellulose compounds substituted with an acyl group or a carbamoyl group are suitably used. Especially, acylated hydroxyalkyl celluloses or carbamoylated hydroxyalkyl celluloses substituted further with an acyl group or a carbamoyl group on the hydroxyl group of a hydroxyalkyl cellulose are preferable.

As the substituent acyl groups are mentioned, for example, acyl groups having from approximately 1 to 15 carbon atoms. Examples of such acyl groups include aliphatic acyl groups that may have a substituent such as a phenyl group and a hydroxyl group and aromatic acyl groups that may have a substituent such as an alkyl group and a hydroxyl group, such as a benzoyl group. Further, the aliphatic acyl groups may contain a reactive unsaturated double bond, such as a (meth)acryloyl group and a cinnamoyl group.

Further, examples of optionally substituted alkyl groups include alkyl groups having from 1 to about 15 carbon atoms, which may have a substituent such as a hydroxyl group, an epoxy group, and a phenyl group. In the case where the alkyl group has an epoxy group, it can be used as a reactive group for immobilization of the orientation.

The molecule weight of the cellulose derivative that is used in the invention is not particularly limited so far as the cellulose derivative has liquid crystalline properties as described above but is usually 2,500 or more, preferably 20,000 or more, more preferably 50,000 or more, and further preferably 80,000 or more. The upper limit of the molecular weight is usually approximately not more than 1,000,000, preferably not more than 500,000, more preferably not more than 300,000, and further preferably not more than 200,000.

More specifically, the cellulose derivative to be used in the invention is a cellulose derivative having a structure represented by the following general formula [Formula 1]:

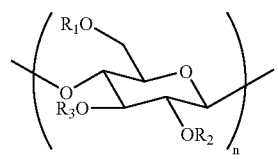

[Formula 1]

(wherein $R_1$, $R_2$, and $R_3$ each independently represents $CH_3CH(OX)CH_2-$, $XOCH_2CH_2-$, or $Xa$; $X$ and $Xa$ are an substituent; $R_1$, $R_2$, and $R_3$ may be the same or different; and n is an integer of 10 or more), and the derivative itself is a thermotropic liquid crystal compound, or the derivative is a compound having a lyotropic liquid crystal capability. $X$ and $Xa$ are an arbitrary organic substituent, and examples include ones enumerated previously as other substituent with which a hydrogen atom of the hydroxyl group on the cellulose is substituted. Further, n is preferably an integer of 10 or more, more preferably 50 or more, and further preferably 100 or more. Xs and Xas present in the foregoing one molecule may be different or the same. However, it is preferred that one or more thereof in the repeating unit be a substituent other than hydrogen. In the case where at least a part of plural Xs and Xas present respectively in one molecule is a reactive group or contains a reactive group, it is preferred that at least a part of the remaining Xs and Xas is a non-reactive group (a group other than hydrogen). Such is preferable in terms of points of controlling the degree of crosslinking and imparting flexibility to the film.

As preferred X in the [Formula 1] can be enumerated as an acyl group represented by Y—CO— or a carbamoyl group represented by Y—NH—CO—. In this formulae, Y represents a (C1–C10) aliphatic group such as a methyl group, an ethyl group, a propyl group, an isopropyl group, an n-butyl group, an isobutyl group, a tert-butyl group, a pentyl group, a neopentyl group, a hexyl group, a cyclohexyl group, an octyl group, a nonyl group, a decyl group, a benzyl group, a naphthylmethyl group, a hydroxy-substituted (C1–C4)alkyl group or a group in which the hydroxyl group thereof is further substituted with a (C1–C4)acyl group or a (C1–C10)alkyl group, a vinyl group which may be substituted with a (C1–C3)alkyl group, an acetylene group and a cynnamyl group; or an aromatic group having from 6 to 14 carbon atoms such as a phenyl group, a naphthyl group, an anthracenyl group a fluororenyl group and a biphenyl group.

In the foregoing formula [Formula 1] of the invention, compounds in which the substituent described in the section of cellulose derivatives (the substituent being hereinafter referred to as "the foregoing substituent") is introduced into a hydroxy(C1–C4)alkyl cellulose can be mentioned as preferred compounds, and compounds into which the foregoing acyl group represented by Y—CO— or carbamoyl group represented by Y—NH—CO— is introduced are more preferable. For example, when the hydroxy(C1–C4)alkyl cellulose is hydroxypropyl cellulose and examples are expressed by a formula, compounds represented by [Formula 7] to [Formula 12] are enumerated.

In the formulae, at least two of $X_1$, $X_2$ and $X_3$ represent an arbitrary substituent other than H, and preferably the foregoing substituent, and the remaining one represents H or an arbitrary substituent other than H, and preferably the foregoing substituent. Preferred examples of groups represented by $X_1$, $X_2$, and $X_3$ include a methyl group, an ethyl group, a propyl group, an isopropyl group, an n-butyl group, an isobutyl group, a tert-butyl group, a pentyl group, a neopentyl group, a hexyl group, a cyclohexyl group, an octyl group, a nonyl group, a decyl group, a benzyl group, a naphthylmethyl group, a hydroxy-substituted (C1–C4)alkyl group or a group in which the hydroxyl group is further substituted with a (C1–C14)acyl group or a (C1–C10)alkyl group, an epoxy group-substituted alkyl group (such as a glycidyl group), an unsaturated bond-containing (C1–C10) aliphatic group optionally substituted with a (C1–C3)alkyl group, such as a vinyl group, an acetylene group, and a cynnamyl group (such as a vinyl group and an acryloyl group), or an aromatic group having from 6 to 14 carbon atoms such as a phenyl group, a naphthyl group, an anthracenyl group, a fluororenyl group and a biphenyl group.

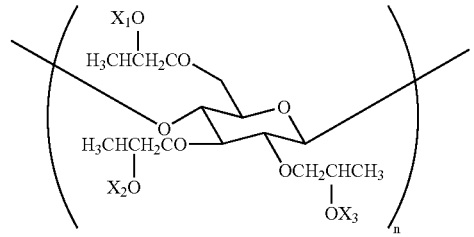

[Formula 7]

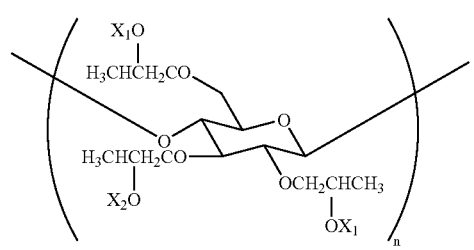

[Formula 8]

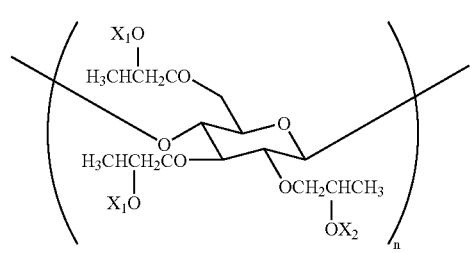

[Formula 9]

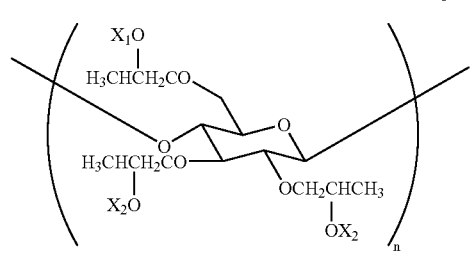

[Formula 10]

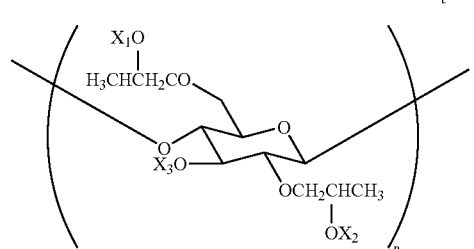

[Formula 11]

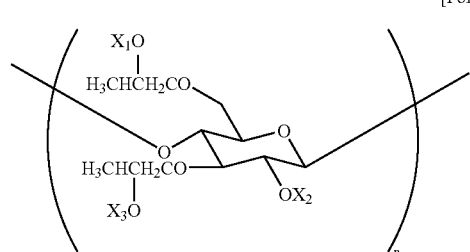

[Formula 12]

In the invention, more preferred compounds are compounds in which the foregoing acyl group is introduced into a hydroxy(C1–C4)alkyl cellulose.

As the acyl group-introduced hydroxy(C1–C4)alkyl cellulose derivative, for example, in the case of hydroxypropyl cellulose, it can be represented by [Formula 2] to [Formula 5] (the terminal ends of the formulae are generally hydrogen or any one of the substituents on other hydroxyl group). While it is considered that the actual substituent on the hydroxyl group of hydroxypropyl cellulose is not always equal to ones expressed by the formulae, the following formulae will be employed herein for the sake of convenience.

In addition, in the formulae, Y represents a methyl group, an ethyl group, a propyl group, an isopropyl group, an n-butyl group, an isobutyl group, a tert-butyl group, a pentyl group, a neopentyl group, a hexyl group, a cyclohexyl group, an octyl group, a nonyl group, a decyl group, a benzyl group, a naphthylmethyl group, an aliphatic group having from 1 to 10 carbon atoms, which may be substituted with a (C1–C3)alkyl group, such as a vinyl group, an acetylene group and a cynnamyl group, or an aromatic group having from 6 to 14 carbon atoms such as a phenyl group, a naphthyl group, an anthracenyl group, a fluororenyl group and a biphenyl group.

The degree of substitution to show how extent the acyl group is introduced in the molecule (3.0 at the maximum) is preferably approximately from 0.1 to 3.0, more preferably from 0.5 to 3.0, and further preferably from 1.0 to 3.0. With respect to the specific state of the degree of substitution, for example, [Formula 2] shows a degree of substitution of 3.0, [Formula 3] and [Formula 4] show a degree of substitution of 2.0, and [Formula 5] shows a degree of substitution of 1.0. Since the degree of substitution is, for example, expressed by how extent the substituent is introduced to the hydroxyl group in one molecule of the cellulose derivative before the substitution, it is not limited to an integer. In addition, in the formulae, n is the same as in the case of [Formula 1].

[Formula 2]

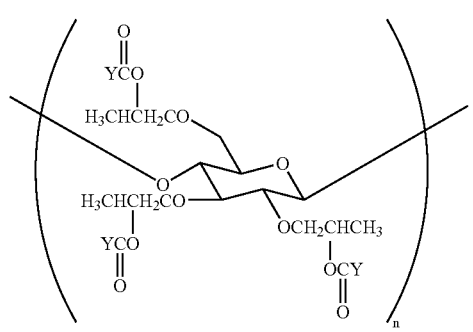

[Formula 3]

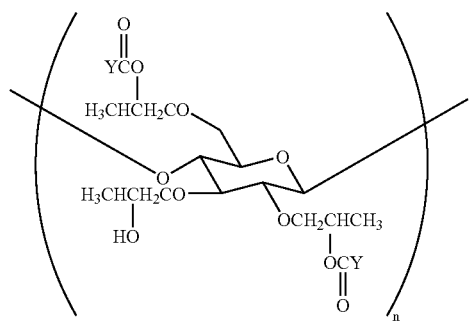

[Formula 4]

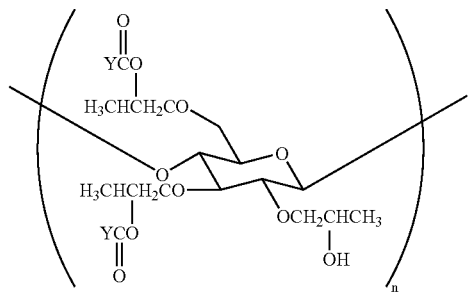

[Formula 5]

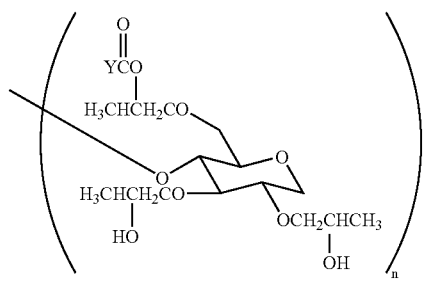

In addition, when the cellulose derivative is a hydroxy (C1–C4)alkyl cellulose ester, the compound that the acyl group in the said ester contains either one of an aliphatic unsaturated double bond-containing acyl group having from 4 to 10 carbon atoms or a tertiary acyl group having from 4 to 10 carbon atoms, and when the acyl group is an aliphatic unsaturated double bond-containing acyl group having from 4 to 10 carbon atoms, the ester further contains an alkyl-carbonyl group having from 1 to 10 carbon atoms, are a novel compound that has first been synthesized by the present inventors. Such compounds forms a thermotropic liquid crystal at normal temperature and at atmospheric pressure and are suitable for the retardation film of the invention. When a liquid crystal film is formed using such a compound, its birefringent value satisfies the foregoing relationship (1). Thermotropic liquid crystal compounds satisfying such conditions at normal temperature and at atmospheric pressure are not known in not only cellulose derivatives but also other thermotropic liquid crystal compounds.

Examples of carbamoyl group-introduced hydroxyalkyl cellulose derivatives include carbamoylated hydroxypropyl celluloses represented by [Formula 6].

In the formula, Y has the same meanings as defined above. Further, the degree of substitution with the acyl group (3.0 at the maximum) is preferably approximately from 0.1 to 3.0, more preferably from 0.5 to 3.0, and further preferably from 1.0 to 3.0. [Formula 6] exemplifies the case where the degree of substitution is 3.0. Since the degree of substitution is, for example, shown by how many substituents are introduced to the hydroxyl group in one molecule of the cellulose derivative before the substitution, it is not limited to an integer. In addition, in the formulae, n is the same as in the case of [Formula 1].

[Formula 6]

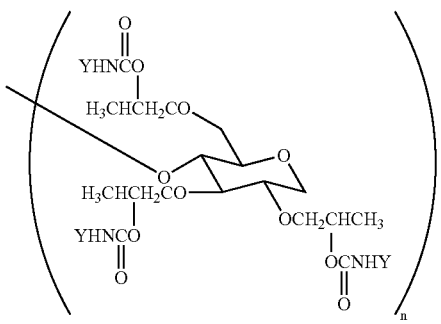

Any of the liquid crystalline cellulose derivatives to be used in the invention, including of the foregoing novel compounds synthesized by the present inventors, can be obtained by esterifying a cellulose with an organic acid corresponding to the desired compound or etherifying a cellulose with a halide corresponding to the desired compound. Further, when the desired compound is a hydroxyalkyl cellulose ester, it can be obtained by esterifying a commercially available hydroxyalkyl cellulose with an organic acid corresponding to the desired compound. Moreover, when a suitable hydroxyalkyl cellulose is not available, a glycidyl compound corresponding to the desired hydroxyalkyl cellulose may be added to a cellulose, or a cellulose may be reacted with a hydroxyalkyl halide in the customary manner. Additionally, when the desired compound is a hydroxyalkyl cellulose ether, it can be obtained by reacting and etherifying a hydroxyalkyl cellulose with a halide corresponding to the desired compound.

What and how many substituents to be introduced into one molecule of the cellulose can properly be determined depending on natures of the desired liquid crystalline cellulose derivative such as a temperature range where it exhibits liquid crystalline properties, double refraction properties, wavelength dispersion characteristics, viscosity, easiness of orientation, workability, and reactivity. For example, in the case of reducing the viscosity of the liquid crystalline compound (in the invention, including both thermotropic liquid crystalline compounds and compounds having a lyotropic liquid crystal capability), an aliphatic acyl group containing a long chain alkyl group may be introduced. Further, in the case of fixing the orientation state after the orientation by a reactive group in the cellulose derivative, the foregoing reactive group such as a (meth)acryloyl group and a glycidyl group may be introduced into the molecule. Moreover, when many of such reactive groups are introduced, the hardness of the film after fixation of the orientation is enhanced. In the case where the reactive group is introduced, when a saturated aliphatic acyl group such as a (C1–C10)alkylcarbonyl group is introduced as other substituent into the remaining hydroxyl group, by changing the substitution rate or changing the length or branching state of the alkyl chain of the acyl group, it is possible to change the viscosity, easiness of orientation, wavelength dispersion characteristics, etc. of the resulting liquid crystalline cellulose derivative. Additionally, for example, by introducing an aliphatic acyl group and an aromatic acyl group as the substituents and changing the rate of degrees of substitution of the both, it is possible to change the viscosity, easiness of orientation, and wavelength dispersion characteristics of the resulting liquid crystal polymer. The substitution rate of the sum of the respective substituents is preferably from 5% to 100%, more preferably from 15% to 100%, and further preferably from 30% to 100% per the whole of hydroxyl groups present in the molecule.

In the cellulose derivative to be used in the invention, the temperature range where it exhibits liquid crystalline properties, double refraction properties, wavelength dispersion characteristics, viscosity, easiness of orientation, immobilization after the orientation, etc. can be controlled by the kind of substituent, combination of respective substituents, and degree of substitution. By using such a liquid crystalline compound of the invention, it is possible to obtain the retardation films of the invention having various double refraction properties, wavelength dispersion characteristics, and hardness.

In the next place, the thermotropic liquid crystalline compound of the invention will be described.

The thermotropic liquid crystalline compound of the invention is characterized by satisfying the following relationship (1):

$$\Delta n 450 \leq \Delta n 550 \leq \Delta n 650 \quad (1)$$

wherein $\Delta n 550$ represents a birefringence at a wavelength of 550 nm; $\Delta n 450$ represents a birefringence at a wavelength of 450 nm; and $\Delta n 650$ represents a birefringence at a wavelength of 650 nm.

Examples of such compounds include cellulose derivatives in which a hydroxyl group of a hydroxyalkyl cellulose is substituted with an aliphatic unsaturated double bond-containing acyl group having from 4 to 10 carbon atoms or a tertiary acyl group having from 4 to 10 carbon atoms (hereinafter also referred to as "thermotropic liquid crystalline cellulose derivative"). More specifically, the foregoing cellulose derivatives that the present inventors have newly synthesized can be exemplified. The foregoing thermotropic liquid crystalline derivatives are ones substituted with the foregoing specific acyl group (an aliphatic unsaturated double bond-containing acyl group having from 4 to 10 carbon atoms or a tertiary acyl group having from 4 to 10 carbon atoms), and so far as the foregoing conditions are not hindered, the hydroxyl group of the hydroxyalkyl cellulose, which is not substituted with the specific acyl group, may be substituted with other substituent such as an acyl group having from 1 to about 10 carbon atoms, which may contain an aromatic group, and an alkyl group having from 1 to about 10 carbon atoms. The substitution rate with the foregoing specific acyl group is not particularly limited so far as the thermotropic liquid crystalline cellulose derivative satisfies the foregoing conditions, but usually, is preferably 10% or more, more preferably 20% or more, and further preferably 30% or more per the whole of hydroxyl groups. The upper limit of the substitution rate may be 100% but usually is approximately 95%. Examples of the aliphatic unsaturated double bond-containing acyl group having from 4 to 10 carbon atoms include a (meth)acryloyl group (meaning an acryloyl group or/and a methacryloyl group) and a cinnamoyl group. Examples of the tertiary acyl group having from 4 to 10 carbon atoms include a t-butyryl group, a t-heptanoyl group, and a cumyl group. Examples of alkyls in the hydroxyalkyl cellulose include alkyls having from 1 to about 5 carbon atoms, and more preferably alkyls having from 1 to 4 carbon atoms. Alkyls having from 2 to 3 carbon atoms are most preferable from the standpoints of easiness of availability, etc. Representative examples of the hydroxyalkyl cellulose include hydroxymethyl cellulose, hydroxyethyl cellulose, hydroxypropyl cellulose, and hydroxybutyl cellulose.

Thermotropic liquid crystalline cellulose derivatives having a molecular weight of approximately 3,000 at the minimum are employable. Usually, the molecule weight is preferably 10,000 or more, more preferably 20,000 or more, further preferably 50,000, and most preferably 80,000 or more as the case may be. The upper limit is usually approximately not more than 1,000,000, preferably not more than 500,000, more preferably not more than 300,000, and further preferably not more than 200,000.

Specific examples of the thermotropic liquid crystalline cellulose derivative include hydroxypropyl cellulose esters substituted with both (meth)acryloyl and butyloyl and hydroxypropyl cellulose esters substituted with pivaloyl.

For example, the thermotropic liquid crystalline cellulose derivative can be obtained by esterifying the hydroxyl of the hydroxyalkyl cellulose with an aliphatic unsaturated double bond-containing organic acid having from 4 to 10 carbon atoms or (C1–C4) organic acid having the tertiary carbon atom at the α-position (hereinafter the both being sometimes referred to simply as "specific organic acid"); if desired, further substituting the remaining hydroxyl group with an alkyl group such as an alkyl group having from 1 to 10 carbon atoms or an acyl group other than those as introduced for the foregoing esterification such as an acyl group having from 1 to 10 carbon atoms (excluding the acyl groups as introduced for the foregoing esterification) in the customary manner to attain a proper degree of substitution; and observing the resulting cellulose derivative by a polarization microscope to select a compound that is confirmed to be in the state of liquid crystal. Esterification with other organic acid than the specific organic acid or alkylation carrying out according to need may be carried out subsequently to or simultaneously with the esterification with the foregoing specific organic acid.

In the thermotropic liquid crystalline cellulose derivative, when it is processed into a liquid crystal film, the refractive index and retardation value vary depending on a difference in its weight average molecular weight, the content when formed into a liquid crystal composition, and the kind and amount of other compound to be compounded together. Therefore, by selecting the molecular weight of the raw material cellulose or cellulose derivative such as hydroxyalkyl celluloses or properly selecting substances to be compounded, it is possible to easily obtain various retardation films.

Accordingly, the thermotropic liquid crystalline compound is suited for application to retardation films.

In the next place, the production process of a film in which the cellulose derivative liquid crystal of the invention is oriented in a specific direction.

When the liquid crystalline cellulose derivative to be used is a thermotropic liquid crystalline cellulose derivative, the cellulose derivative is dissolved in an evaporativity organic solvent such as methyl ethyl ketone in an appropriate concentration optionally together with a photopolymerization initiator, and the solution is coated on an appropriate substrate so as to have a proper thickness. Subsequently, the solvent is evaporated off to form a film, the resulting cellulose derivative liquid crystal film is oriented in a specific direction within the range where it exhibits liquid crystalline properties by shearing, stretching, etc., and if desired, the orientation is fixed as mentioned hereinafter. There can be thus obtained the desired liquid crystal film. Further, in the case of thermotropic liquid crystalline derivatives, a liquid crystal film can be prepared in the same manner as in the case of lyotropic liquid crystalline cellulose derivatives as described later.

When the liquid crystalline cellulose derivative to be used is a cellulose derivative having a lyotropic liquid crystal capability, the cellulose derivative is dissolved in other compound such as a solvent for lyotropic liquid crystal, preferably a reactive compound (hereinafter sometimes referred to as "reactive compound") and usually a liquid reactive compound at normal temperature, optionally adding a photopolymerization initiator in a concentration at which the cellulose derivative forms a liquid crystal to form a liquid crystal state (liquid crystal composition), which is then diluted with an evaporatibity organic solvent as the need arises, to obtain a film forming composition. Subsequently, similarly in the foregoing thermotropic liquid crystalline cellulose derivative, the film forming composition is coated and dried to form a film. There is thus obtained a lyotropic liquid crystal film comprising the cellulose derivative as a liquid crystal compound. This film is oriented in a specific direction by stretching, shearing, etc. in the same manner as described above, and if desired, the orientation is fixed as described later. There can be thus obtained the desired liquid crystal film in which the cellulose derivative liquid crystal is oriented in a specific direction.

In any of the foregoing cases, the liquid crystalline cellulose derivative may be used singly or in combination with two or more. Further, the same is also applicable to the reactive compound.

As the foregoing solvent for forming a lyotropic liquid crystal, ones capable of preparing the film of the invention, especially the retardation film and having affinity with the liquid crystal compound to be used in the invention are preferable, and any solvents that form a liquid crystal state (lyotropic liquid crystal) in a composition with the liquid crystal compound can be used. Examples of such compounds include reactive liquid crystalline compounds described in Japanese Patent No. 3,228,348, WO 97/44703, and WO 98/00475 and non-liquid crystalline reactive compounds described later. Examples of non-liquid crystalline liquid reactive compounds include (meth)acrylate compounds and compounds containing a reactive group such as a glycidyl group and an isocyanate group. Such a compound (reactive compound) is mixed with the liquid crystalline cellulose derivative to be used in the invention in a proportion such that the cellulose derivative can exhibit liquid crystalline properties and is used for formation of the film of the invention as a liquid crystal composition (a liquid crystal comprising the cellulose derivative as a liquid crystal compound).

Examples of the foregoing (meth)acrylate compound include (meth)acrylic acid esters that are a reaction product of a polyhydric alcohol having from 1 to 30 carbon atoms and from 2 to 10 hydroxyl groups with (meth)acrylic acid; (meth)acrylate compounds that are a reaction product of a glycidyl ether of a polyhydric alcohol having from 1 to 30 carbon atoms and from 1 to 10 hydroxyl groups with (meth)acrylic acid; urethane(meth)acrylate compounds obtained by crosslinking the hydroxyl group residue of the said (meth)acrylate compound with a diisocyanate; and (meth)acrylate compounds containing an isocyanuric ring.

Examples of (meth)acrylic acid esters that are a reaction product of a polyhydric alcohol having from 1 to 30 carbon atoms and from 1 to 10 hydroxyl groups with (meth)acrylic acid include trimethylolpropane tri-(meth)acrylate, ditrimethylolpropane tetra(meth)acrylate, pentaerythritol di(meth)acrylate, pentaerythritol tri-(meth)acrylate, pentaerythritol tetra(meth)acrylate, di-pentaerythritol, pentaacrylate, dipentaerythritol hexa-acrylate, triglycerol di(meth)acrylate, polypropylene glycol di(meth)acrylate, tripropylene glycol di(meth)acrylate, polyethylene glycol di(meth)acrylate, tetraethylene glycol di(meth)acrylate, triethylene glycol di(meth)acrylate, 1,6-hexanediol di(meth)acrylate, 2-hydroxyethyl(meth)acrylate, 2-hydroxypropyl(meth)acrylate, polypropylene glycol (meth)acrylate, polyethylene glycol (meth)acrylate, methoxypolyethylene glycol(meth)acrylate, methoxy-tetraethylene glycol(meth)acrylate, methoxytriethylene glycol(meth)acrylate, methoxyethylene glycol(meth)acrylate, methoxyethyl(meth)acrylate, glycidyl(meth)acrylate, glycerol(meth)acrylate, ethylcarbitol(meth)acrylate, 2-ethoxyethyl(meth)acrylate, butoxytriethylene glycol (meth)acrylate, butanediol mono(meth)acrylate, bisphenol A di(meth)acrylate, and ethylene oxide-modified bisphenol A di(meth)acrylate.

Examples of (meth)acrylate compounds that are a reaction product of a glycidyl ether of a polyhydric alcohol having from 1 to 30 carbon atoms and from 2 to 10 hydroxyl groups with (meth)acrylic acid include a reaction product of glycerol triglycidyl ether with (meth)acrylic acid, a reaction product of trimethylolpropane triglycidyl ether with (meth)acrylic acid, a reaction product of propylene glycol diglycidyl ether with (meth)acrylic acid, a reaction product of 1,6-hexanediol diglycidyl ether with (meth)acrylic acid, a reaction product of glycerol di(meth)acrylate, and ethylene glycol diglycidyl ether with (meth)acrylic acid, a reaction product of diethylene glycol diglycidyl ether with (meth) acrylic acid, a reaction product of bisphenol A diglycidyl ether with (meth)acrylic acid, and a reaction product of phenoxyhydroxypropyl(meth)acrylate, and butylglycidyl ether with (meth)acrylic acid.

Examples of urethane(meth)acrylate compounds obtained by crosslinking the hydroxyl group residue of the said (meth)acrylate compound with a diisocyanate include urethane (meth)acrylate compounds comprising a reaction product of the hydroxyl group residue of the said (meth) acrylate compound with a diisocyanate compound, and preferably a hydrocarbon diisocyanate having from 3 to 15 carbon atoms, and more preferably from 5 to 10 carbon atoms, such as 1,6-hexamethylene diisocyanate, isophorone diisocyanate, toluene diisocyanate, 4,4-diphenylmethane diisocyanate, xylylene diisocyanate, methylenebis(4-cyclohexyl isocyanate), and trimethylhexamethylene diisocyanate. Examples of such compounds include a reaction product of pentaerythritol tri(meth)acrylate with 1,6-hexamethylene diisocyanate and a reaction product of pentaerythritol tri(meth)acrylate with isophorone diisocyanate.

Examples of (meth)acrylate compounds containing an isocyanuric ring include esters of a hydroxy(C1–C5)alkyl isocyanurate or a caprolactone modified product thereof with (meth)acrylic acid, such as tris(acryloxyethyl)isocyanurate, tris(methacryloxyethyl)isocyanurate, caprolactone-modified tris(acryloxyethyl)isocyanurate, bis(acryloxyethyl) hydroxyethyl isocyanurate, and bis(methacryloxyethyl) hydroxyethyl isocyanurate.

As (meth)acrylate compounds other than the foregoing compounds, may be used esters of an alicyclic alcohol having from 4 to 6 carbon atoms, which may contain a hetero atom such as oxygen atom, with (meth)acrylic acid, esters of a (C1–C5)alkylamino-substituted or cyano-substituted (C1–C4)alcohol with (meth)acrylic acid, and amide compounds of a nitrogen-containing (C4–C5)alicyclic amine with (meth)acrylic acid. Examples include tetrahydrofurfuryl (meth)acrylate, caprolactone-modified tetrahydrofurfuryl (meth)acrylate, acryloyl morpholine, N,N-dimethylaminoethyl (meth)acrylate, and 2-cyanoethyl(meth)acrylate.

These respective (meth)acrylate compounds may be used singly or by mixing plurality of (meth)acrylate compounds. In the case of mixing, the kind and mixing ratio of the respective (meth)acrylate compounds can properly be adjusted taking into consideration the degree of immobilization as described later, the hardness of the resulting retardation film, and the stability against environments such as temperature and humidity.

Among the compositions comprising a mixture of such a non-liquid crystalline reactive compound and a liquid crystalline cellulose derivative (liquid crystal polymer), the compositions exhibiting liquid crystalline properties may be said to be a lyotropic liquid crystal composition (a liquid crystal comprising a cellulose derivative as a liquid crystal compound). The liquid crystalline compounds to be used in the invention and other compounds may be used as a composition comprising a mixture of a single member of the respective compounds or a mixture of plurality of the respective compounds. The respective combinations can properly be selected depending on the characteristics of the desired retardation film, and it is possible to control the temperature range where the resulting lyotropic liquid crystal composition of the invention exhibits liquid crystalline properties, the double refraction properties, the wavelength dispersion characteristics, the viscosity, the easiness of orientation, and the like by their kinds and mixing ratio. The mixing ratio of the liquid crystalline compound of the invention to other compound varies depending on the kinds of the reactive compounds to be used, but as the ratio at which the composition exhibits liquid crystalline properties, the composition usually contains the liquid crystalline compound of the invention in an amount of 50% (by mass, hereafter the same unless otherwise indicated) or more, preferably 60% or more, and more preferably 70% or more, with the remainder being other compounds, preferably a solvent for lyotropic liquid crystal, and if desired, a photopolymerization initiator, etc. Further, there may be the case where the liquid crystalline compound of the invention is preferably contained in an amount of 80% or more as the case may be.

For example, in the case where a (meth)acrylate compound is used as a liquid crystal-forming solvent, the liquid crystalline compound of the invention is preferably used in an amount of approximately 1 part or more, more preferably 2 parts or more, and further preferably 3 parts or more based on 1 part of the (meth)acrylate compound (on a mass basis, hereafter the same). By forming a film using the foregoing composition comprising a mixture of the liquid crystalline compound of the invention with other compound, especially the lyotropic liquid crystal composition of the invention and orienting the liquid crystal to a specific direction, it is possible to obtain the films, especially retardation films of the invention having various double refraction properties, wavelength dispersion characteristics and hardness.

With respect to the retardation film of the invention, the foregoing film oriented to a specific direction of the invention can be used as a retardation film as it is.

The specific direction as referred to herein means a direction where the refractive index is anisotropic and is either one or two of a direction where the refractive index becomes the maximum within the film plane in the film, a direction orthogonal thereto, or a thickness direction. In the specific direction, it is preferable that at least one direction is a direction where the refractive index becomes the maximum within the film plane. Examples of such include the case where in the retardation film, both the refractive index in a direction where the refractive index becomes the maximum within the film plane (refractive index-maximum direction) and the refractive index in a thickness direction are larger than the refractive index in a direction orthogonal to the refractive index-maximum direction.

Next, the method of orientation in a specific direction will be hereunder described in detail.

As the method that is most frequently employed, is exemplified a method of uniaxially or biaxially stretching the liquid crystalline compound or the lyotropic liquid crystal composition after or during the film formation. In this case, it is preferable that the immobilization of the oriented state is carried out after the uniaxial or biaxial stretching. However, as the case may be, it is possible to properly polymerize the liquid crystalline compound or the lyotropic liquid crystal composition by heat or UV rays prior to the orientation to lightly fix it to some extent, followed by uniaxial or biaxial stretching.

Further, for example, the orientation can also be carried out by a shearing method in which the liquid crystal polymer or the lyotropic liquid crystal composition is sandwiched in the liquid crystal state between substrates such as films and glass plates, and the upper and lower substrates are moved in the same direction at different speed from each other, or a slide shearing method in which the upper and lower substrates are moved in a direction opposite to each other. Even in this case, when the orientation is fixed, it is preferable that the immobilization is carried out after shearing.

Moreover, for example, there is a method in which using glass plates or plastic films having an oriented film such as polyimides, polyvinyl alcohol and derivatives thereof, or plastic films such as a triacetyl cellulose film, said oriented film surface or plastic film surface is subjected to rubbing treatment or ultraviolet polarizing treatment, and then the liquid crystalline compound or the lyotropic liquid crystal is laminated, in the solution state or singly by coating such as spin coating gravure coating, or other method on the treatment surface, and then allowed to stand for orientation under a proper condition where the liquid crystal state can be kept. In particular, according to the orientation method using rubbing treatment substrates, the orientation to an arbitrary direction is possible by grasping the relationship of the orientation direction of the liquid crystalline compound or the lyotropic liquid crystal composition with the rubbing direction. Accordingly, by previously preparing retardation films comprising the liquid crystal polymer or the lyotropic liquid crystal composition oriented therein so as to have a desired angle to the absorption axis of the polarizing film, it is possible to laminate them by role-to-role, thereby simplifying the production step and increasing the yield. In addition, though the degree of orientation is properly determined by a prescribed retardation value of the desired retardation film, for obtaining a higher retardation, such can be attained by increasing the degree of orientation (double refraction properties) or increasing the thickness of the retardation film. The thickness of the retardation film of the invention is properly determined by the prescribed retardation value and double refractive properties but is preferably from approximately 0.5 to 200 μm, and more preferably from approximately 1 to 100 μm.

The liquid crystal film thus oriented to a specific direction according to the invention can be used as the retardation film of the invention as it is if no inconvenience in use is present, or after fixing the orientation state, if desired. In general, it is preferable to undergo the immobilization because it is possible to impart stable optical characteristics against the environmental changes in temperature, humidity, etc. by fixing the orientation state.

Next, the method of fixing the orientation state will be hereunder described in detail.

For fixing the orientation state, a method of undergoing crosslinking or polymerization while keeping the orientation state in the foregoing specific direction. As the method of fixing the orientation state, when the liquid crystalline compound to be used in the invention contains a reactive group such as (methlacryloyl, after forming a liquid crystal film oriented to a specific direction, the orientation of the liquid crystal compound can be fixed by crosslinking or polymerization according to the reactive group that the liquid crystal compound contains, or when the liquid crystal film is a lyotropic liquid crystal film containing a reactive compound, the orientation of the liquid crystal compound can be fixed by crosslinking or polymerization through reaction of both compounds of the reactive group-containing liquid crystal compound and the reactive compound. Further, when the liquid crystalline compound to be used does not contain a reactive group, after forming a reactive compound-containing lyotropic liquid crystal film, the orientation can be fixed by crosslinking or polymerization (the both being hereinafter simply referred to "polymerization") of the reactive compound.

The method of polymerization includes a method in which polymerization is carried out by ultraviolet irradiation in the presence of a photopolymerization initiator and a method in which polymerization is carried out by heat. For fixing the orientation while keeping the orientation in a specific direction, ultraviolet irradiation is preferable method.

As the photopolymerization initiator, compounds that are used in usual UV curable resins can be used. Examples of such compounds include 2-methyl-1-[4-(methylthio)phenyl]-2-morpholinopropane-1 (Irgacure 907 manufactured by Ciba Speciality Chemicals), 1-hydroxycyclohexylphenyl ketone (Irgacure 184 manufactured by Ciba Speciality Chemicals), 4-(2-hydroxyethoxy)-phenyl(2-hydroxy-2-propyl)ketone (Irgacure 2959 manufactured by Ciba Speciality Chemicals), 1-(4-dodecylphenyl)-2-hydroxy-2-methylpropan-1-one (Darocure 953 manufactured by Merck KGaA), 1-(4-isopropylphenyl)-2-hydroxy-2-methylpropan-1-one (Darocure 1116 manufactured by Merck KGaA), 2-hydroxy-2-methyl-1-phenylpropan-1-one (Irgacure 1173 manufactured by Ciba Speciality Chemicals), acetophenone-based compounds such as diethoxyacetophenone, benzoin compounds such as benzoin, benzoin methyl ether, benzoin ethyl ether, benzoin isopropyl ether, benzoin isobutyl ether, and 2,2-dimethoxy-2-phenylacetophenone (Irgacure 651 manufactured by Ciba Speciality Chemicals), benzophenone compounds such as benzoylbenzoic acid, methyl benzoylbenzoate, 4-phenylbenzophenone, hydroxybenzophenone, 4-benzoyl-4'-meth yldiphenyl sulfide, and 3,3'-dimethyl-4-methoxybenzophenone (Kayacure MBP manufactured by Nippon Kayaku Co., Ltd.), and thioxanthone compounds such as thioxanthone, 2-chlorothioxanthone (Kayacure CTX manufactured by Nippon Kayaku Co., Ltd.), 2-methylthioxanthone, 2,4-dimethylthioxanthone (Kayacure RTX), isopropylthioxanthone, 2,4-dichlorothioxanthone (Kayacure CTX manufactured by Nippon Kayaku Co., Ltd.), 2,4-diethylthioxanthone (Kayacure DETX manufactured by Nippon Kayaku Co., Ltd.), and 2,4-diisopropylthioxanthone (Kayacure DITX manufactured by Nippon Kayaku Co., Ltd.). These photopolymerization initiators may be used singly or in admixture of two or more in an arbitrary ratio.

In the case where benzophenone based compounds or thioxanthone based compounds are used, for accelerating the photopolymerization reaction, auxiliaries can be used jointly. Examples of such auxiliaries include amine compounds such as triethanolamine, methyldiethanolamine, triisopropanolamine, n-butylamine, N-methyldiethanolamine, diethylaminoethyl methacrylate, Michler's ketone, 4,4'-diethylaminophenone, ethyl 4-dimethylaminobenzoate, (n-butoxy)ethyl 4-dimethylaminobenzoate, and isoamyl 4-dimethylaminobenzoate.

The amount of the photopolymerization initiator is preferably approximately 0.5 parts by weight or more and not more than 10 parts by weight, and more preferably 2 parts by weight or more and not more than 8 parts by weight based on 100 parts by weight of the total of the reactive compound such as (meth)acrylate compounds and the liquid crystalline compound containing a reactive group such as a (meth)acryloyl group in the liquid crystalline compound of the invention (when only either one is contained, the amount means its amount). The amount of the auxiliary is from approximately 0.5 times to 2 times (on a weight basis) based on the photopolymerization initiator.

Further, the amount of ultraviolet irradiation varies depending on the kind of the liquid crystalline compound of the invention or the lyotropic liquid crystal composition of the invention, the kind and amount of the photopolymerization initiator, and the film thickness but is desirably from approximately from 100 to 1,000 mJ/cm$^2$. The atmosphere during ultraviolet irradiation may be in air or in an inert gas such as nitrogen. However, when the film thickness is thin, since curing does not sufficiently take place due to oxygen obstacle, in such case, it is preferable to undergo curing by ultraviolet irradiation in an inert gas such as nitrogen.

In the retardation film obtained in the invention, the wavelength dispersion characteristics can be controlled by controlling the kind of the liquid crystalline compound of the invention or the degree of orientation of the lyotropic liquid crystal composition of the invention, by selecting the mixing ratio of the liquid crystalline compound to other compound in the lyotropic liquid crystal composition of the invention, and further by controlling the molecular weight of the cellulose derivative.

Next, the method of controlling the wavelength dispersion characteristics will be hereunder described in detail.

As the method of controlling the wavelength dispersion characteristics by controlling the degree of orientation of the cellulose derivative liquid crystal of the invention, for example, in the same liquid crystalline compound or the same lyotropic liquid crystal composition, such can be attained by changing the stretching condition or shearing condition to change the birefringent value at 550 nm ($\Delta$n550). The $\Delta$n550 necessary for obtaining the desired wavelength dispersion characteristics varies depending on the kind of the liquid crystalline compound to be used, the formulation of the lyotropic liquid crystal composition, and the kind of other compound to be used. By orienting the cellulose derivative liquid crystal such that the $\Delta$n550 is 0.0020 or more, and preferably 0.0030 or more, it is possible to obtain retardation films in which a retardation value in a longer wavelength side than 550 nm is equal to or larger than that at 550 nm, and a retardation value in a shorter wavelength side than 550 nm is equal to or smaller than that at 550 nm. Further, the retardation film of the invention, in which a retardation value in a longer wavelength side than 550 nm is larger than that at 550 nm, and a retardation value in a shorter wavelength side than 550 nm is smaller than that at 550 nm, can be obtained by preparing a film having a $\Delta$n550 value larger than that of a film in which both a retardation value in a longer wavelength side than 550 nm and a retardation value in a shorter wavelength side than 550 nm are approximately equal to a retardation value at 550 nm. Such a phase retardation film of the invention, in which a retardation value in a longer wavelength side than 550 nm is larger than that at 550 nm, and a retardation value in a shorter wavelength side than 550 nm is smaller than that at 550 nm, can, for example, impart an approximately equal retardation to respective wavelength over a wide range of the visible region by optimizing such degree.

Further, as the method of controlling the wavelength dispersion characteristics by selecting the mixing ratio of the liquid crystalline compound to be used in the invention and other compound in the lyotropic liquid composition of the invention, for example, in the case where in the lyotropic liquid crystal composition comprising the liquid crystalline compound (or the liquid crystal polymer comprising a cellulose derivative) to be used in the invention, the reactive compound such as the foregoing (meth)acrylate compounds, and the photopolymerization initiator, a composition preferably having a mixing ratio (weight ratio) of the liquid crystalline compound VS. the reactive compound=8 or more vs. less than 2, and more preferably 9 or more vs. 1 or less is used, the composition is subjected to orientation treatment such as slide shearing treatment and if desired, further subjected to fixing of orientation by ultraviolet irradiation, whereby a retardation film in which a retardation value in a longer wavelength side than 550 nm is larger than that at 550 nm, and a retardation value in a shorter wavelength side than 550 nm is smaller than that at 550 nm can be obtained. Further, in the case where a composition preferably having the mixing ratio of the former vs. the latter=5 or more vs. 5 or less, and more preferably 6 or more vs. 4 or less is used, a retardation film in which a retardation value in a longer wavelength side than 550 nm is approximately equal to or larger than that at 550 nm, and a retardation value in a shorter wavelength side than 550 nm is approximately equal to or smaller than that at 550 nm can be obtained in the same manner. Thus, it is possible to easily change the wavelength dispersion characteristics of the retardation plate only by changing the mixing ratio of the liquid crystal polymer and other compound in the lyotropic liquid crystal composition.

Moreover, as the method of controlling the wavelength dispersion characteristics by using a different kind of the liquid crystalline compound to be used in the invention, such as a cellulose derivative having a different molecular weight, for example, by preparing the retardation film of the invention using the cellulose derivative having the number of n of from approximately 50 to 200, it is possible to obtain a retardation film in which are retardation value in a longer wavelength side than 550 nm is approximately equal to or larger than that at 550 nm, and a retardation value in a shorter wavelength side than 550 nm is approximately equal to or smaller than that at 550 nm. Also, by preparing the retardation film of the invention by changing the number of n to 250 or more, it is possible to obtain a retardation film in which a retardation value in a longer wavelength side than 550 nm is larger than that at 550 nm, and a retardation value in a shorter wavelength side than 550 nm is smaller than that at 550 nm.

By laminating the thus obtained retardation film of the invention on a polarizing film such that the delay axis of the retardation film has a prescribed angle against the absorption axis of the polarizing film, it is possible to obtain the elliptically polarizing film of the invention. Further, by laminating the thus obtained retardation film of the invention having a retardation value of from 130 to 140 nm, and preferably about 137 nm at 550 on a polarizing film such that an angle between the absorption axis of the polarizing film and the delay axis of the retardation film is 45°, it is possible to obtain the circular polarizing film of the invention. Moreover, by laminating the retardation film of the invention having retardation value of from 270 to 280 nm, and preferably about 275 nm at 550 nm such that an angle between the absorption axis of the polarizing film and the delay axis of the retardation film is 45°, it is possible to obtain the potical rotatory film of the invention.

Since the thus obtained elliptically polarizing film of the invention has a wavelength dispersion corresponding to the wavelength dispersion characteristics that liquid crystal cells of liquid crystal display devices have, it exhibits an excellent double refraction compensating effect and can enhance the retardation and visibility of display images.

Further, the thus obtained circular polarizing film of the invention can be used in various image display devices such as reflection type liquid crystal display devices, reflection semi-transmission type liquid crystal display devices, electroluminescent displays, and plasma displays and can prevent reflection of an external light and enhance the contrast of display images. In particular, if the wavelength dispersion characteristics of the circular polarizing film have a retardation of approximately ¼ of the wavelength against respective wavelength in the visible region, since a linearly polarized light can be converted into a circular polarized light over a wide wavelength range, it is possible to obtain an excellent reflection preventing effect and a contrast enhancing effect as compared with circularly polarizing films using a usual polycarbonate.

In a specific embodiment, for example, in the case of reflection type liquid crystal display devices, the circularly polarizing film of the invention using the retardation film of the invention, which gives a retardation of approximately ¼ of the wavelength against respective wavelength in the visible region, is laminated on a liquid crystal cell having a light reflection layer with an adhesive, etc. at a prescribed angle such that the polarizing film constituting the circular polarizing film is located at foreground of the image display surface side of the liquid crystal cell, thereby obtaining the reflection type liquid crystal display device of the invention. According to this reflection type liquid crystal display, during undergoing black displaying, by shielding a light reflected by the light reflection layer by the circularly polarizing film of the invention over a wide wavelength range in the visible region, it is possible to undergo black displaying clearly, resulting in enabling to enhance the visibility and retardation of the display image. Further, in the case of electroluminescent displays, the circular polarizing film of the invention using the retardation film of the invention, which gives a retardation of approximately ¼ of the wavelength against respective wavelength in the visible region, is aligned or is laminated on the image display surface with an adhesive, etc., such that the polarizing film constituting the circularly polarizing film is positioned at the front of the image display surface, thereby obtaining the electroluminescent display of the invention. Since this display can prevent reflection of metal electrodes present in the light-emitting layer by the circular polarizing plate of the invention over a wide wavelength range in the visible region, it is possible to enhance the visibility of the display image.

Further, according to the thus obtained rotatively polarizing and optical rotatory film of the invention, if the wavelength dispersion characteristics of the retardation film have a retardation of approximately ½ of the wavelength against respective wavelength in the visible region, a polarization axis of the linearly polarized light can be rotated without converting it into an elliptically polarized light. Accordingly, for example, by using the polarizing and optical rotatory in a portion the polarization axis within a liquid crystal projector to be rotated, it is possible to enhance the utilization efficiency of light and prevent degradation of the polarizing film due to the absorption of light.

EXAMPLES

The invention will be more specifically described below with reference to the following Examples and Comparative Example.

Example 1

Twenty-five grams of hydroxypropyl cellulose (manufactured by Aldrich, molecular weight MW: 100,000) was dissolved in 200 ml of acetone under reflux upon heating. Next, 62.5 ml of acryloyl chloride (manufactured by Wako Pure Chemical Industries, Ltd.) was added dropwise thereto while cooling with ice water, and after completion of the dropwise addition, the mixture was stirred at room temperature for one hour and further stirred for 2 hours under reflux by heating. Next, 30 ml of n-butyryl chloride (manufactured by Wako Pure Chemical Industries, Ltd.) was added dropwise thereto while cooling with ice water, and after completion of the dropwise addition, the mixture was stirred at room temperature for one hour and further stirred for 2 hours under reflux by heating. This reaction mixture was thrown into a large excess of ice water, whereby a white reaction product was precipitated. This product was thoroughly washed with water, again dissolved in acetone, re-precipitated with water, and then washed with water. After repeating this operation, the product was dried in vacuo in the state where the product was not exposed with light, to obtain an acrylic acid-esterfied and butyric acid-esterfied a hydroxypropyl cellulose. ester having been subjected to esterification with acrylic acid and esterification with butyric acid. It was confirmed from observation by a polarization microscope that this compound was in the liquid crystal state at room temperature, and it caused heat polymerization at about 125° C. but kept the liquid crystal state. Next, 5 parts by weight of a photopolymerization initiator (a trade name: Irgacure 184, manufactured by Ciba Speciality Chemicals) was added to 100 parts by weight of the said hydroxypropyl cellulose ester, from which was then prepared a solution having a solids content of 20% by weight using methyl ethyl ketone. Next, this solution was coated on a glass plate, dried by heating at 100° C. for 2 minutes, allowed to stand for cooling to room temperature, and then sandwiched by another glass plate. Next, one of the glass plates was fixed, and the other glass plate was slid in one direction, followed by curing by irradiation of a high-pressure mercury vapor lamp (80 W/cm) to obtain a 30 μm-thick retardation film of the invention. The resulting retardation film was measured using an automatic birefringence analyzer (a trade name: KOBRA-21ADH, manufactured by Oji Scientific Instruments) and found to have a retardation value of 180 nm at a wavelength of 550 nm. Additionally, a retardation value at respective wavelength was measured, and a ratio (wavelength dispersion characteristics) of the wavelength difference value at respective retardation value at 550 nm was determined. The results are shown in FIG. 1. At this time, birefringences Δn450, Δn550 and Δn650 at wavelengths of 450 nm, 550 nm and 650 nm were 0.0039, 0.0060 and 0.0076, respectively.

Furthermore, the resulting hydroxypropyl cellulose ester had the following infrared absorption spectrum and nuclear magnetic resonance spectrum.

IR (NaCl): 3500 (br.), near 2850 to 2950, near 1730, 1640, 1620, 1460, 1410, 1380, 1300, 1280, 1200, 1100 (br.), 990, 940, 840, 810 cm$^{-1}$.

$^1$H-NMR (300 MHz, in CDCl$_3$):

One hydrogen atom in one monomer unit of the cellulose is defined to be 1H. Protons on the ester substituent were expressed in terms of decimal on a basis of peaks of 2.88 to 4.50 ppm.

δ=0.85 to 1.35 (13.2H, m), 1.63 (1.86H, m), 2.25 (1.81H, m), 2.78 (1.43H, m), 2.88 to 4.50 (16H, m), 5.05 (—OH, br), 5.82 (1.16H, d), 6.13 (1.19H, t), 6.40 (1.18H, d).

The degrees of substitution of the acryloyl group and the n-butyryl group were determined in the following manner.

The obtained hydroxypropyl cellulose ester was dried in vacuo until no weight change was observed. Thereafter, 20 mg of this compound was dissolved in 0.5 ml of deuterium chloroform taking twenty-four hours to prepare a sample solution for NMR measurement. In the $^1$H-NMR measurement (300 MHz, in CDCl$_3$), degrees of substitution were determined from area ratios of a broad peak at 2.88 to 4.50 ppm (protons at the 1-, 2-, 3-, 4-, 5- and 6-positions of sugar and protons on the hydroxypropyl group, CH$_3$CH(OR)CH$_2$—) and peaks at 5.82, 6.13 and 6.40 ppm (olefinic protons on the acryloyl group) and peaks at 0.85 to 1.35, 1.63, 2.25 and 2.78 ppm (protons on the n-butyryl group and protons on hydroxypropyl, CH$_3$CH(OR)CH$_2$—). Herein, R represents an acryloyl group or an n-butyryl group, or hydrogen. The degree of substitution of the acryloyl group was 1.18, and the degree of substitution of the n-butyryl group was 1.33, with the total degrees of substitution being 2.51.

Example 2

Figure 2:
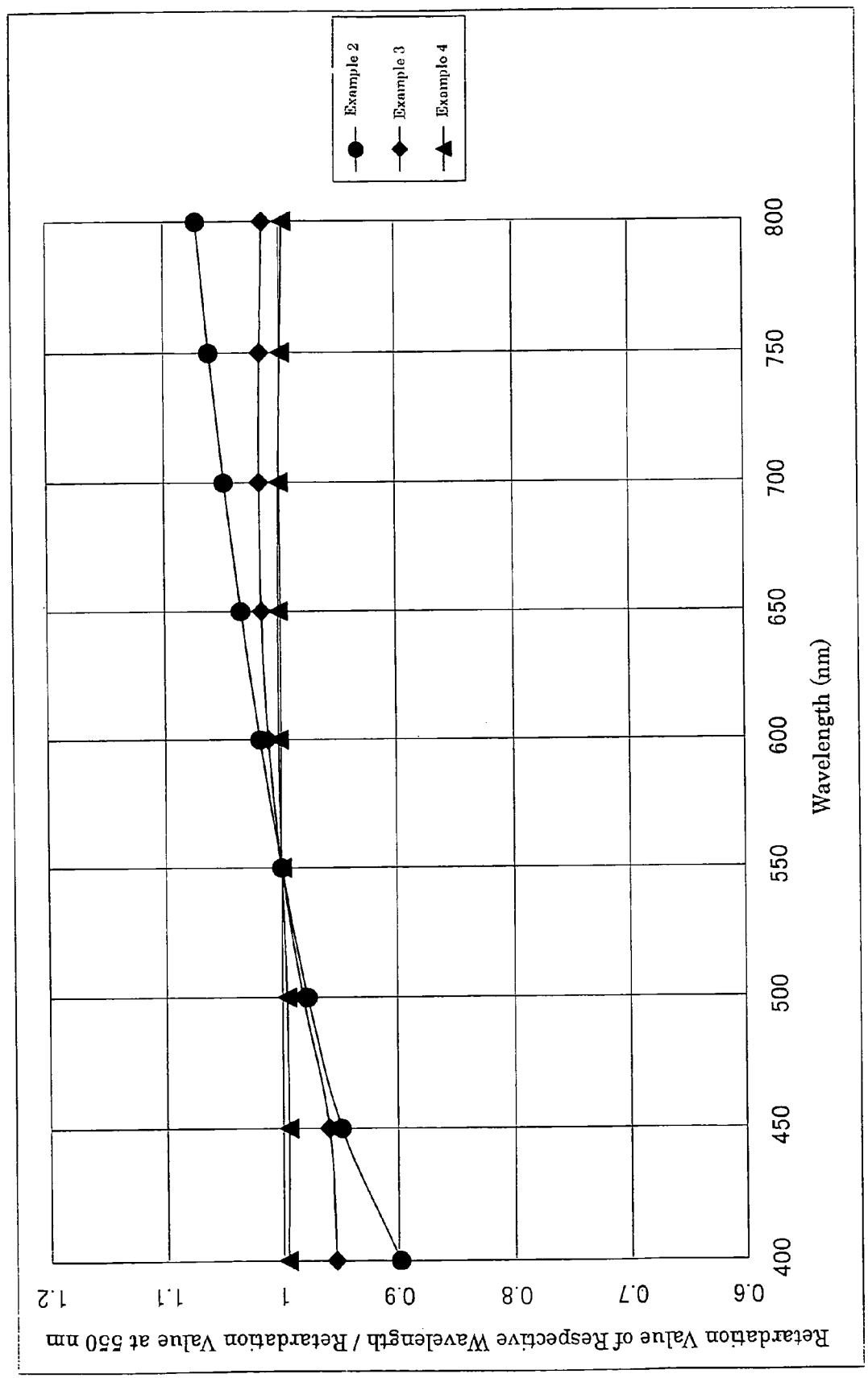
FIG. 2 is a graph showing wavelength dispersion characteristics as measured with respect to films obtained in Examples 2 to 4.

A acrylic acid-esterified and propionic acid-esterified hydroxypropyl cellulose ester was obtained in the same manner as in Example 1, except for using 30 ml of propionyl chloride (manufactured by Wako Pure Chemical Industries, Ltd.) in place of the n-butyryl chloride. It was confirmed from observation by a polarization microscope that this compound was in the liquid crystal state at room temperature, and it caused heat polymerization at about 125° C. but kept the liquid crystal state. Next, a composition comprising 90 parts by weight of this hydroxypropyl cellulose ester, 10 parts of a reaction product (a trade name: Kayarad R-167, manufactured by Nippon Kayaku Co., Ltd.) of 1,6-hexanediol diglycidyl ether with acrylic acid, which is a non-liquid crystalline compound, and 5 parts by weight of a photopolymerization initiator (a trade name: Irgacure 184, manufactured by Ciba Speciality Chemicals) was prepared. It was noted that this composition was a lyotropic liquid crystal composition because it was in the liquid crystal state at room temperature. Next, this composition was diluted using methyl ethyl ketone to prepare a solution having a solids content of 20% by weight. Next, this solution was coated on a glass plate, dried upon heating at 100° C. for 2 minutes, allowed to stand for cooling to room temperature, and then sandwiched by another glass plate. Next, one of the glass plates was fixed, and the other glass plate was slid in one direction, followed by curing upon irradiation by a high-pressure mercury vapor lamp (80 W/cm) to obtain a 35 μm-thick retardation film of the invention. The resulting retardation film had a retardation value of 211 nm at 550 nm. Next, the wavelength dispersion characteristics of this retardation film was evaluated in the same manner as in Example 1. The results are shown in FIG. 2. At this time, birefringences at the respective wavelength was Δn450=0.0057, Δn550=0.0060 and Δn650=0.0062, respectively.

Furthermore, the resulting hydroxypropyl cellulose ester had the following infrared absorption spectrum.

IR (NaCl): 3475 (br.), near 2850 to 2950, near 1720, 1635, 1615, 1460, 1400, 1370, 1290, 1270, 1190, 1080 (br.), 980, 930, 880, 840, 810 cm$^{-1}$.

The degrees of substitution of the acryloyl group and the propionyl group were determined in the following manner.

In the foregoing reaction process, acryloyl chloride (manufactured by Wako Pure Chemical Industries, Ltd.) was added, and the mixture was stirred at room temperature for one hour and further stirred under reflux by heating for 2 hours. Thereafter, before adding propionyl chloride, a part of the reaction solution was taken out and thrown into a large excess of ice water, whereby a white reaction product was precipitated. This product was thoroughly washed with water, again dissolved in acetone, re-precipitated with water, and then washed with water. After repeating this operation, the product was dried in vacuo in the state where the product was not exposed with light, to obtain an acrylic acid-esterified hydroxypropyl cellulose. A prescribed amount of the resulting acrylic acid-esterified hydroxypropyl cellulose ester was weighed and dissolved in ethanol, to which was then added an excess of a 1 mol/L sodium hydroxide aqueous solution, followed by stirring at room temperature overnight. Next, the excessive portion of sodium hydroxide necessary for the hydrolysis was titrated with a 0.5 mol/L hydrochloric acid aqueous solution to determine a degree of substitution. A degree of substitution of the acryloyl group was 0.57. Next, a degree of substitution of the acrylic-esterified and propionic acid-esterified hydroxypropyl cellulose as obtained by the foregoing reaction was determined in the same operation. The degree of substitution was 2.53. This degree of substitution was the total degrees of substitution of the acryloyl group and the propionyl group, and the degree of substitution of the propionyl group was 1.96.

Example 3

A composition was prepared in the same operation as in Example 2, except for using 80 parts by weight of the hydroxypropyl cellulose ester used in Example 2 and 20 parts by weight of a reaction product (a trade name: Kayarad R-167, manufactured by Nippon Kayaku Co., Ltd.) of 1,6-hexanediol diglycidyl ether with acrylic acid. It was noted that this composition was a lyotropic liquid crystal composition because it was in the liquid crystal state at room temperature. Next, A 40 μm-thick retardation film of the invention was obtained in the same operation as in Example 2. The resulting retardation film had a retardation value of 191 nm at 550 nm. Next, The wavelength dispersion characteristics of this retardation film was evaluated in the same manner as in Example 1. The results are shown in FIG. 2. At this time, birefringence at the respective wavelength was Δn450=0.0046, Δn550=0.0048 and Δn650=0.0049 respectively.

Example 4

A composition was prepared in the same operation as in Example 2, except for using 70 parts by weight of the hydroxypropyl cellulose ester used in Example 2 and 30 parts by weight of a reaction product (a trade name: Kayarad R-167, manufactured by Nippon Kayaku Co., Ltd.) of 1,6-hexanediol diglycidyl ether with acrylic acid. It was noted that this composition was a lyotropic liquid crystal composition because it was in the liquid crystal state at room temperature. Next, A 35 μm-thick retardation film of the invention was obtained in the same operation as in Example 2. The obtained retardation film had a retardation value of 185 nm at 550 nm. Next, the wavelength dispersion characteristics of this retardation film was evaluated for in the same manner as in Example 1. The results are shown in FIG. 2. At this time, birefringence at the respective wavelength was Δn450=0.0053, Δn550=0.0053 and Δn650=0.0053 respectively.

Example 5

Figure 3:
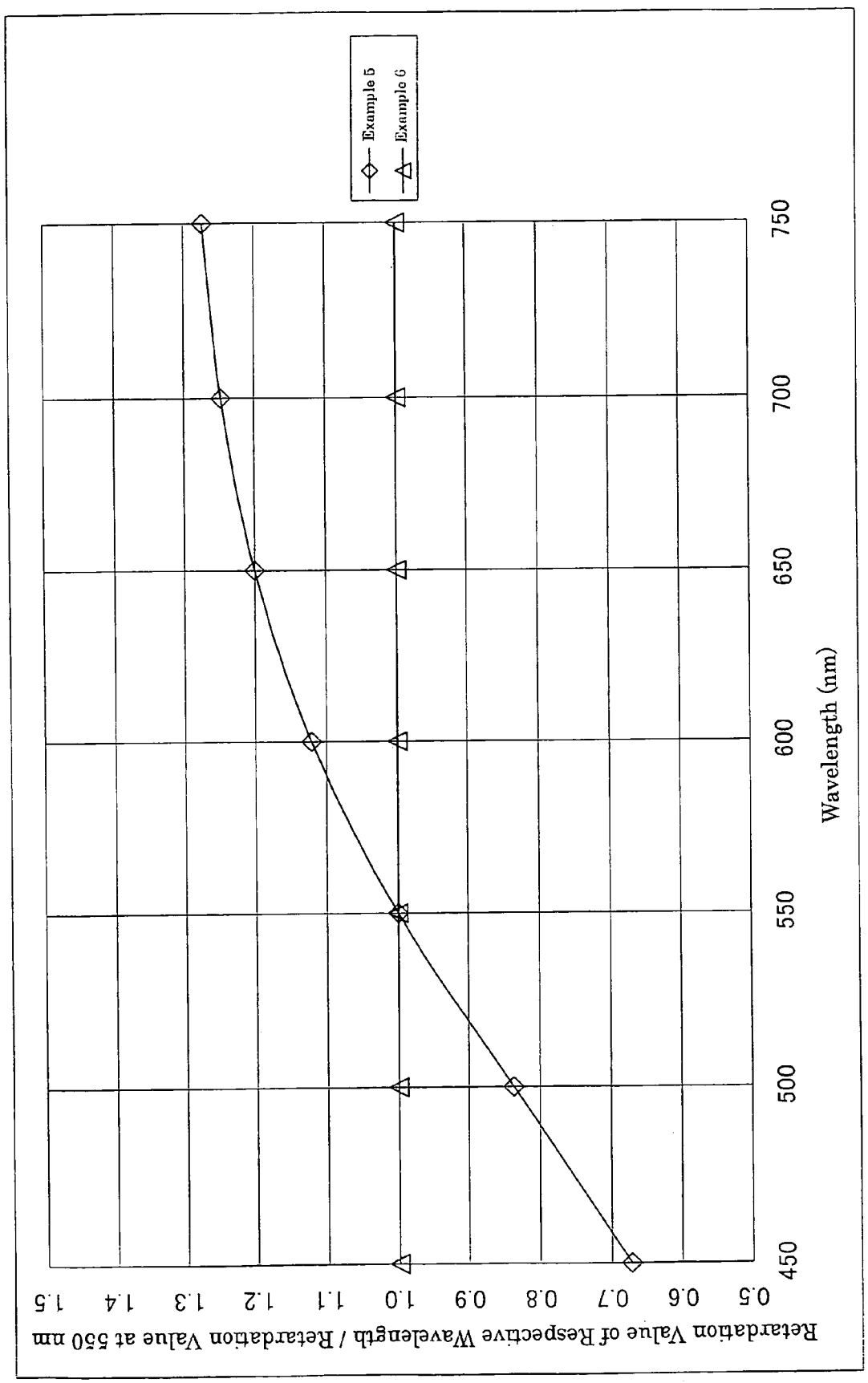
FIG. 3 is a graph showing wavelength dispersion characteristics as measured with respect to films obtained in Examples 5 and 6.

Hydroxypropyl cellulose (manufactured by Aldrich, molecular weight Mw: 100,000) (5.0 g) was dissolved in 100 ml of acetone under reflux by heating. Next, 11.0 ml of pivaloyl chloride (manufactured by Wako Pure Chemical Industries, Ltd.) was added dropwise thereto while cooling with ice water, and after completion of the dropwise addition, the mixture was stirred for 6 hours under reflux by heating. This reaction mixture was thrown into a large excess of ice water, whereby a white reaction product was precipitated. This reaction product was thoroughly washed with water, again dissolved in acetone, re-precipitated with water, and then washed with water. After repeating these operations twice, the product was dried in vacuo to obtain a pivalic acid-esterified hydroxypropyl cellulose ester. It was confirmed from observation by a polarization microscope that this compound was in the liquid crystal state at room temperature, and it kept the liquid crystal state until it was thermally decomposed at about 140° C. Next, a solution of a solids content of 10% by weight was prepared using this hydroxypropyl cellulose ester and methyl ethyl ketone. This solution was dropped on a silicone-coated surface of a silicone-coated PET film (PET3801 manufactured by Lintec Corporation) and dried at room temperature, followed by peeling apart from the PET film to prepare a hydroxypropyl cellulose ester film. This film was uniaxially stretched three-fold in an atmosphere at 100° C. to prepare a 46 μm-thick retardation film of the invention. The resulting retardation film had a retardation value of 346 nm at 550 nm. Next, the wavelength dispersion characteristics of retardation film was evaluated for in the same manner as in Example 1. The results are shown in FIG. 3. At this time, birefringence at the respective wavelength was Δn450=0.0065, Δn550=0.0075 and Δn650=0.0086 respectively.

Furthermore, the resulting hydroxypropyl cellulose ester had the following infrared absorption spectrum and nuclear magnetic resonance spectrum.

IR (KBr): 3470 (br.), near 2970 to 2870, 1820, 1730, 1480, 1460, 1370, 1280, 1160, 1160, 1090 cm$^{-1}$.

$^1$H-NMR (300 MHz, in CDCl$_3$):

One hydrogen atom in one monomer unit of the cellulose is defined to be 1H. Protons on the ester substituent were expressed in terms of decimal on a basis of peaks of 2.60 to 4.50 ppm.

δ=0.9 to 1.4 (18.4H, m), 2.60 to 4.50 (16H, m), 4.98 (—OH, br).

The degree of substitution of the pivaloyl group was determined in the same operation as in Example 1. The pivalic acid-esterified hydroxypropyl cellulose ester was dried in vacuo until no weight change was observed. Thereafter, 20 mg of this compound was dissolved in 0.5 ml of deuterium chloroform taking twenty-four hours to prepare a sample solution for NMR measurement. In the $^1$H-NMR measurement (300 MHz, in CDCl$_3$), degrees of substitution were determined from area ratios of a broad peak at 2.60 to 4.50 ppm (protons at the 1-, 2-, 3-, 4-, 5- and 6-positions of sugar and protons on the hydroxypropyl group, CH$_3$CH(OR)CH$_2$—) to a broad peak at 0.9 to 1.4 ppm (protons on the pivaloyl group and protons on hydroxypropyl, CH$_3$CH(OR)CH$_2$—). Herein, R represents a pivaloyl group or hydrogen. The degree of substitution of the pivaloyl group was 1.03.

Example 6

A 49 μm-thick retardation film of the invention was prepared in the same operation as in Example 5, except for changing the stretching ratio of uniaxial stretching to 2 times. The resulting retardation film had a retardation value of 168 nm at 550 nm. Next, the wavelength dispersion characteristics of this retardation film was evaluated for in the same manner as in Example 1. The results are shown in FIG. 3. At this time, birefringence at the respective wavelength was Δn450=0.0034, Δn550=0.0034 and Δn650=0.0034, respectively.

Example 7

Ninety-five parts by weight of the hydroxypropyl cellulose ester obtained in Example 1 and 5 parts by weight of dipentaerythritol hexaacrylate (Karayad DPHA manufactured by Nippon Kayaku Co., Ltd.) were uniformly mixed to obtain a composition. As a result of observation by a polarization microscope, this composition was in the liquid crystal state at room temperature and it was noted that the composition was a to be a lyotropic liquid crystal composition of the invention. Additionally, this composition kept the liquid crystal state even by mixing with 5 parts by weight of a polymerization initiator (Irgacure 184 manufactured by Ciba Speciality Chemicals). Also, a retardation film of the invention, whose orientation state was fixed, was obtained in the same operation as in Example 2.

Example 8

Ninety parts by weight of the hydroxypropyl cellulose ester obtained in Example 1 and 10 parts by weight of polyethylene glycol diacrylate (Karayad PEG400DA manufactured by Nippon Kayaku Co., Ltd.) were uniformly mixed to obtain a composition. As a result of observation by a polarization microscope, this composition was in the liquid crystal state at room temperature and it was noted that the composition was a lyotropic liquid crystal composition of the invention. Additionally, this composition kept the liquid crystal state even by mixing with 5 parts by weight of a polymerization initiator (Irgacure 184 manufactured by Ciba Speciality Chemicals). Also, a retardation film of the invention, whose orientation state was fixed, was obtained in the same operation as in Example 2.

Example 9

Eighty parts by weight of the hydroxypropyl cellulose ester obtained in Example 1 and 20 parts by weight of 2-hydroxyethyl acrylate were uniformly mixed to obtain a composition. As a result of observation by a polarization microscope, this composition was in the liquid crystal state at room temperature and it was noted that the composition was a lyotropic liquid crystal composition of the invention. Additionally, this composition kept the liquid crystal state even by mixing with 5 parts by weight of a polymerization initiator (Irgacure 184 manufactured by Ciba Speciality Chemicals). Also, a retardation film of the invention, whose orientation state was fixed, was obtained in the same operation as in Example 2.

Example 10

Eighty parts by weight of the hydroxypropyl cellulose ester obtained in Example 1 and 20 parts by weight of bis(acryloxyethyl)hydroxyethyl isocyanurate (Aronix M-215 manufactured by Toagosei Co., Ltd.) were uniformly mixed to obtain a composition. As a result of observation by a polarization microscope, this composition was in the liquid crystal state at room temperature and it was noted that the composiotn was a lyotropic liquid crystal composition of the invention. Additionally, this composition kept the liquid crystal state even by mixing with 5 parts by weight of a polymerization initiator (Irgacure 184 manufactured by Ciba Speciality Chemicals). Also, a retardation film of the invention, whose orientation state was fixed, was obtained in the same operation as in Example 2.

Example 11

Ninety parts by weight of the hydroxypropyl cellulose ester obtained in Example 1 and 10 parts by weight of a reaction product (Karayad PET-30I manufactured by Nippon Kayaku Co., Ltd.) of pentaerythritol triacrylate with isophorone diisocyanate were uniformly mixed to obtain a composition. As a result of observation by a polarization microscope, this composition was in the liquid crystal state at room temperature and it was noted that the composition was a lyotropic liquid crystal composition of the invention. Additionally, this composition kept the liquid crystal state even by mixing with 5 parts by weight of a polymerization initiator (Irgacure 184 manufactured by Ciba Speciality Chemicals). Also, a retardation film of the invention, whose orientation state was fixed, was obtained in the same operation as in Example 2.

Example 12

Ninety parts by weight of the hydroxypropyl cellulose ester obtained in Example 1 and 10 parts by weight of acryloyl morpholine (Karayad RM-1001 manufactured by Nippon Kayaku Co., Ltd.) were uniformly mixed to obtain a composition. As a result of observation by a polarization microscope, this composition was in the liquid crystal state at room temperature and it was noted that the composition was a lyotropic liquid crystal composition of the invention. Additionally, this composition kept the liquid crystal state even by mixing with 5 parts by weight of a polymerization initiator (Irgacure 184 manufactured by Ciba Speciality Chemicals). Also, a retardation film of the invention, whose orientation state was fixed, was obtained in the same operation as in Example 2.

Example 13

Ninety parts by weight of the hydroxypropyl cellulose ester obtained in Example 1, and 5 parts by weight of dipentaerythritol hexaacrylate (Karayad DPHA manufactured by Nippon Kayaku Co., Ltd.) and. 5 parts by weight of 2-hydroxyethyl acrylate were uniformly mixed to obtain a composition. As a result of observation by a polarization microscope, this composition was in the liquid crystal state at room temperature and it was noted that the composition was a lyotropic liquid crystal composition of the invention. Additionally, this composition kept the liquid crystal state even by mixing with 5 parts by weight of a polymerization initiator (Irgacure 184 manufactured by Ciba Speciality Chemicals). Also, a retardation film of the invention, whose orientation state was fixed, was obtained in the same operation as in Example 2.

Example 14

Eighty parts by weight of the hydroxypropyl cellulose ester obtained in Example 5 and 20 parts by weight of bis(acryloxyethyl)hydroxyethyl isocyanurate (Aronix M-215 manufactured by Toagosei Co., Ltd.) were uniformly mixed to obtain a composition. As a result of observation by a polarization microscope, this composition was in the liquid crystal state at room temperature and it was noted that the composition was a lyotropic liquid crystal composition of the invention. Additionally, this composition kept the liquid crystal state even by mixing with 5 parts by weight of a polymerization initiator (Irgacure 184 manufactured by Ciba Speciality Chemicals). Also, a retardation film of the invention, whose orientation state was fixed, was obtained in the same operation as in Example 2.

Example 15

Sixty parts by weight of the hydroxypropyl cellulose ester obtained in Example 5 and 40 parts by weight of 1,6-hexanediol diacrylate (Karayad HDDA manufactured by Nippon Kayaku Co., Ltd.) were uniformly mixed to obtain a composition. As a result of observation by a polarization microscope, this composition was in the liquid crystal state at room temperature and it was noted that the composition was a lyotropic liquid crystal composition of the invention. Additionally, this composition kept the liquid crystal state even by mixing with 5 parts by weight of a polymerization initiator (Irgacure 184 manufactured by Ciba Speciality Chemicals). Also, a retardation film of the invention, whose orientation state was fixed, was obtained in the same operation as in Example 2.

Comparative Example:

The wavelength dispersion characteristics of a retardation film obtained by uniaxially stretching a polycarbonate (retardation value: 140) are evaluated in the same as Example 1 and the results are shown in FIG. 1. At this time, birefringence at respective wavelength was $\Delta n450=0.0016$, $\Delta n550=0.0015$ and $\Delta n650=0.0014$, respectively.

From the results of Example 1 and Comparative Example, it is noted that in the retardation film of the invention, the retardation value in a longer wavelength side than 550 nm is larger than that at 550 nm; the retardation value in a shorter wavelength side than 550 nm is smaller than that at 550 nm; and that retardation at respective wavelength are approximately equal. Further, from the results of Examples 2 to 4, it is noted that in the retardation films of the invention each obtained from a lyotropic liquid crystal composition, the wavelength dispersion characteristics change by changing the mixing ratio of the liquid crystalline compound and the non-liquid crystalline compound according to the method of the invention. Moreover, it is noted that in Examples 5 and 6, the wavelength dispersion characteristics change by changing the Δ550 value according to the method of the invention; and that in the retardation film of Example 5 according to the invention, which shows a higher Δ550 value than that in Example 6, the retardation value in a longer wavelength side than 550 nm is larger than that at 550 nm, and the retardation value in a shorter wavelength side than 550 nm is smaller than that at 550 nm.

INDUSTRIAL APPLICABILITY

A film made of a liquid crystal (liquid crystal polymer) comprising a cellulose derivative of the invention as a liquid crystal compound can be easily oriented in a specific direction by shearing, etc. Further, retardation films having various wavelength dispersion characteristics can be easily prepared by changing a molecular weight of the cellulose derivative to be used or changing a formulation of a film forming composition. By using a cellulose derivative containing a reactive group as a substituent or using the cellulose derivative liquid crystal comprising reactive compound as a solvent, orientation of a liquid crystal to a specific direction can be easily fixed, thereby enabling to form a retardation film having excellent water resistance and heat resistance, etc. Furthermore, when the film oriented in a specific direction satisfies the following relationship (1):

$$\Delta n450 \leq \Delta n550 \leq \Delta n650 \tag{1}$$

wherein Δn450 represents a birefringent value at a wavelength of 450 nm; Δn550 represents a birefringent value at a wavelength of 550 nm; and Δn650 represents a birefringent value at a wavelength of 650 nm, retardation films having various wavelength dispersion characteristics can be easily prepared. The thus obtained retardation film can be used in various image display devices as circularly or elliptically polarizing films or optical rotatory films in combination with polarizing films and can bring about excellent reflection preventing effect, contrast enhancing effect, double refraction compensating effect, etc. Accordingly, the film, especially retardation film of the invention is very useful in industry.

The invention claimed is:

1. A retardation film comprising a film in which a liquid crystal comprising a cellulose derivative, wherein the cellulose derivative is a cellulose derivative that a hydroxyl group of a hydroxyalkyl cellulose is substituted with an aliphatic unsaturated double bond-containing acyl group having from 4 to 10 carbon atoms or a tertiary acyl group having from 4 to 10 carbon atoms and further a hydroxyl group of the hydroxyalkyl cellulose, which is not substituted with the said acyl group, may be substituted with an acyl group having from 1 to 10 carbon atoms, which may contain an aromatic group, or an alkyl group having from 1 to about 10 carbon atoms, as a liquid crystal compound (hereinafter referred to as a cellulose derivative liquid crystal) is oriented in a stretching direction or a shearing direction by a uniaxially or biaxially stretching method, a shearing method or a slide shearing method.

2. A retardation film comprising a film in which orientation of a cellulose derivative liquid crystal is oriented in a stretching direction or a shearing direction by a uniaxially or biaxially stretching method, a shearing method or a slide shearing method and fixed in a specific direction by crosslinking or polymerization of a reactive substituent on the cellulose derivative or by crosslinking or polymerization of a reactive compound of a liquid crystal constituting component.

3. A retardation film comprising a film in which a cellulose derivative liquid crystal, wherein the cellulose derivative is a cellulose derivative that a hydroxyl group of a hydroxyalkyl cellulose is substituted with an aliphatic unsaturated double bond-containing acyl group having from 4 to 10 carbon atoms or a tertiary acyl group having from 4 to 10 carbon atoms and further a hydroxyl group of the hydroxyalkyl cellulose, which is not substituted with the said acyl group, may be substituted with an acyl group having from 1 to 10 carbon atoms, which may contain an aromatic group, or an alkyl group having from 1 to about 10 carbon atoms, is oriented in a stretching direction or a shearing direction by a uniaxially or biaxially stretching method, a shearing method or a slide shearing method, wherein the film satisfies the following relationship (1):

$$\Delta n450 \leq \Delta n550 \leq \Delta n650 \tag{1}$$

wherein Δn450 represents a birefringent value at a wavelength of 450 nm; Δn550 represents a birefringent value at a wavelength of 550 nm; and Δn650 represents a birefringent value at a wavelength of 650 nm.

4. The retardation film according to any one of claims 1, 2 or 3, wherein the cellulose derivative in the cellulose derivative liquid crystal is a thermotropic liquid crystal compound or a compound having a lyotropic liquid crystal capability.

5. The retardation film according to claim 4, wherein the cellulose derivative in the cellulose derivative liquid crystal is an ester in which a substituent on a hydroxyl group of a hydroxy(C1–C4)alkyl cellulose is an acyl group having from 1 to 10 carbon atoms or a (C1–C10) hydrocarbon residue-substituted carbamoyl group.

6. The retardation film according to claim 5, wherein the ester is an ester having either one of an acyl group containing at least an aliphatic unsaturated double bond and having from 4 to 10 carbon atoms or a tertiary acyl group having from 4 to 10 carbon atoms as the acyl group on the ester.

7. The retardation film according to claim 6, wherein the acyl group containing an aliphatic unsaturated double bond and having from 4 to 10 carbon atoms is an acryloyl group, and the tertiary acyl group having from 4 to 10 carbon atoms is a pivaloyl group.

8. The retardation film according to any one of claims 1, 2 or 3, wherein the cellulose derivative in the cellulose derivative liquid crystal is a cellulose derivative having a structure represented by the following formula:

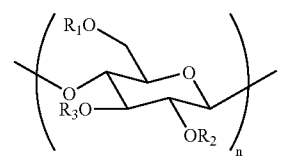

[Formula 1]

wherein $R_1$, $R_2$, and $R_3$ each independently represents $CH_3CH(OX)CH_2$— or $XOCH_2CH_2$—; X is a substituent; $R_1$, $R_2$, and $R_3$ may be the same or different; and n is an integer of 10 or more, and the said derivative itself is a thermotropic liquid crystal compound, or the said derivative is a compound having a lyotropic liquid crystal capability.

9. The retardation film according to any one of claims 1, 2 or 3, wherein the cellulose derivative is a cellulose derivative represented by the following formula:

Formula 1

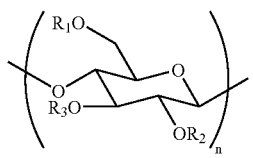

wherein $R_1$, $R_2$, and $R_3$ each independently represents $CH_3CH(OX)CH_2—$, $XOCH_2CH_2—$; X is a substituent; $R_1$, $R_2$, and $R_3$ may be the same or different; and n is an integer of 10 or more, and at least one of plurality of X present in one molecule represents a group different from H; and plurality of $R_1$, $R_2$, and $R_3$ present in one molecule represents at least two kinds of substituents different from each other.

10. The retardation film according to claim 8, wherein the thermotropic liquid crystal compound is a hydroxy(C1–C4) alkyl cellulose ester having at least either one of an (C4–C10)acyl group containing an aliphatic unsaturated double bond or a tertiary acyl group having from 4 to 10 carbon atoms as the acyl group on the ester, and being substituted by the acyl group in a substitution degree of 10 % or more of total hydroxyl groups in the molecule.

11. The retardation film according to claim 2, wherein the fixation of orientation of a cellulose derivative liquid crystal to a specific direction is carried out in the presence of a photopolymerization initiator.

12. The retardation film according to claim 11, wherein the fixation of orientation is carried out by irradiation of ultraviolet rays.

13. The retardation film according to claim 2, wherein the reactive compound is a (meth)acrylate compound.

14. The retardation film according to any one of claims 1, 2 or 3, wherein at least one of the directions is a direction where a refractive index within the resulting retardation film plane becomes the maximum.

15. The retardation film according to any one of claims 1, 2 or 3, wherein a retardation value in a longer wavelength side than 550 nm is equal to or larger than that at 550 nm, and a retardation value in a shorter wavelength side than 550 nm is equal to or smaller than that at 550 nm.

16. The retardation film according to claim 15, wherein a birefringent value at 550 nm (Δn550) is 0.0020 or more.

17. The retardation film according to claim 15, wherein the retardation is a ¼ wavelength or a ½ wavelength.

18. A circularly or elliptically polarizing film or optical rotatory film comprising a lamination film of the retardation film according to claim 15 and a polarizing film laminated therewith.

19. An image display device having the retardation film according to claim 15.

20. A hydroxy(C1–C4)alkyl cellulose ester as a cellulose derivative, characterized by having either one of a (C4–C10) acyl group containing an aliphatic unsaturated double bond or a tertiary acyl group having from 4 to 10 carbon atoms as the acyl group in the ester, and when the ester has a (C4–C10)acyl group containing an aliphatic unsaturated double bond, the ester further contains an alkylcarbonyl group having from 1 to 10 carbon atoms.

21. A liquid crystal film forming composition containing at least either one of following (1) or (2);
(1) a thermotropic liquid crystalline cellulose derivative containing a reactive substituent wherein the reactive substituent is an aliphatic unsaturated double bond-containing acyl group having from 4 to 10 carbon atoms or
(2) both a cellulose derivative having a lyotropic liquid crystal capability and a reactive compound, and a photopolymerizable initiator,
and, when the foregoing (2) is contained, containing both the cellulose derivative having a lyotropic liquid crystal capability and the reactive compound in a proportion such that a mixed solution of the both forms a lyotropic liquid crystal.

* * * * *